United States Patent
Ramalingam et al.

(10) Patent No.: US 10,440,271 B2
(45) Date of Patent: Oct. 8, 2019

(54) ON-CHIP COMPENSATION OF ROLLING SHUTTER EFFECT IN IMAGING SENSOR FOR VEHICLES

(71) Applicant: SONY CORPORATION, Tokyo (JP)

(72) Inventors: Prabakaran Ramalingam, Karnataka (IN); Awadh Bihari Mohan, Karnataka (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/909,294

(22) Filed: Mar. 1, 2018

(65) Prior Publication Data
US 2019/0273869 A1    Sep. 5, 2019

(51) Int. Cl.
| | |
|---|---|
| H04N 5/232 | (2006.01) |
| G01C 21/16 | (2006.01) |
| G06T 7/20 | (2017.01) |
| H04N 19/513 | (2014.01) |

(52) U.S. Cl.
CPC ....... *H04N 5/23267* (2013.01); *G01C 21/165* (2013.01); *G06T 7/20* (2013.01); *H04N 5/2329* (2013.01); *H04N 19/513* (2014.11); *H04N 5/23258* (2013.01)

(58) Field of Classification Search
CPC .... G08G 1/0125; G08G 1/054; G08G 1/0175; G08G 1/015; G08G 1/04; G06T 7/277; G06T 2207/30236; G06T 2207/10028; G06T 2200/04; G01S 17/023; G01S 17/58; G01S 7/484; G01S 7/4808; G01S 7/4802; G01S 17/89; G01S 17/88; G01S 17/66; G06K 2209/23; G06K 9/3241; G06K 9/00785; H04N 5/9206; H04N 9/8205; H04N 5/772; H04N 5/77; G11B 27/19

See application file for complete search history.

(56) References Cited

U.S. PATENT DOCUMENTS

| | | | |
|---|---|---|---|
| 8,786,716 B2 | 7/2014 | Zhou | |
| 2012/0307085 A1* | 12/2012 | Mantzel | H04N 5/23248 348/208.4 |
| 2013/0188069 A1* | 7/2013 | Sendik | H04N 5/217 348/222.1 |
| 2013/0265460 A1* | 10/2013 | Wu | G06T 5/006 348/222.1 |
| 2014/0153840 A1* | 6/2014 | Chiao | H04N 5/235 382/255 |

(Continued)

*Primary Examiner* — Roberto Velez
*Assistant Examiner* — Tuan H Le
(74) *Attorney, Agent, or Firm* — Chip Law Group

(57) ABSTRACT

An image-capture system, which handles on-chip compensation of rolling shutter effect in an imaging sensor, generates motion vector information for a plurality of speed values of a vehicle at each location on a specified route and derives an image-kernel for the plurality of speed values at each location on the specified route. A successive location of the vehicle is predicted at a current location of the vehicle based on the generated motion vector information for a current speed value of the vehicle at the current location on the specified route. A first image, which exhibits a shift of a plurality of pixels, is captured by the imaging sensor at the predicted successive location on the specified route. A second image is generated from the captured first image based on a compensation of the shift of the plurality of pixels in the captured first image.

24 Claims, 12 Drawing Sheets

(56) References Cited

U.S. PATENT DOCUMENTS

| | | | |
|---|---|---|---|
| 2015/0332103 A1* | 11/2015 | Yokota | G06K 9/00791 |
| | | | 348/149 |
| 2016/0360081 A1 | 12/2016 | Tsubaki | |
| 2017/0032503 A1* | 2/2017 | Raichman | G06T 5/006 |
| 2018/0266828 A1* | 9/2018 | Best | G01C 21/28 |
| 2019/0058811 A1* | 2/2019 | Douady-Pleven | H04N 1/3876 |
| 2019/0080181 A1* | 3/2019 | Ermilios | G06K 9/00791 |

* cited by examiner

ON-CHIP COMPENSATION OF ROLLING SHUTTER EFFECT IN IMAGING SENSOR FOR VEHICLES

CROSS-REFERENCE TO RELATED APPLICATIONS/INCORPORATION BY REFERENCE

None.

FIELD

Various embodiments of the disclosure relate to image-capture systems for vehicles. More specifically, various embodiments of the disclosure relate to on-chip compensation of rolling shutter effect in imaging sensor for vehicles.

BACKGROUND

With recent advancements in transportation and logistics, security, surveillance, and consumer focused transportation network, an ever mutating demand is witnessed that necessitates these industries to adopt autonomous and intelligent solutions to counter different challenges put forth with such advancements. Multiple imaging sensors are traditionally used to capture images of objects and path in vicinity of the vehicles. In certain scenarios, a vehicle having an imaging sensor, may be in motion. In cases where the vehicle, such as an autonomous vehicle, uses CMOS-like sensor to capture images and analyze the captured images frame by frame, the effect of rolling shutter is introduced due to the motion of the vehicle. When the vehicle that carries the imaging sensors moves fast relative to the objects in the vicinity, the rolling shutter effect may be more prominent in the captured images, which is not desirable. The rolling shutter effect can possibly cause regions or objects captured in the image to wobble, skew, smear, or have a partial exposure. Therefore, the images obtained from the imaging sensor while the vehicle is in motion may not be suited for further application in numerous image processing operations, such as prediction of position or movement of other objects in a scene, calibration of speed or orientation of the vehicle. Moreover, the use of such images of degraded image quality may lead to poor estimations and can endanger lives, cause delay, compromise the safety, and may prove cost intensive.

Traditionally, such effects on images are compensated using multiple sensors, such as motion, speed, location, acceleration, or gyro, as peripheral connections to the imaging sensors to compensate for the degradation of the image. Such solutions are further available only for low speed applications or where the effect is caused by vibrations of engine or other holding devices. Therefore, such solutions are not compatible for relatively fast moving vehicles. Also, the effects on the images are compensated only after the image is captured and therefore, there is an inherent delay in compensation of the images which is further reciprocated to other image processing systems of the vehicle that factor driving decisions based on the compensated image. Alternatively stated, current solutions lack a real time on-chip compensation inside the imaging sensors.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for on-chip compensation of rolling shutter effect in an imaging sensor for vehicles substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
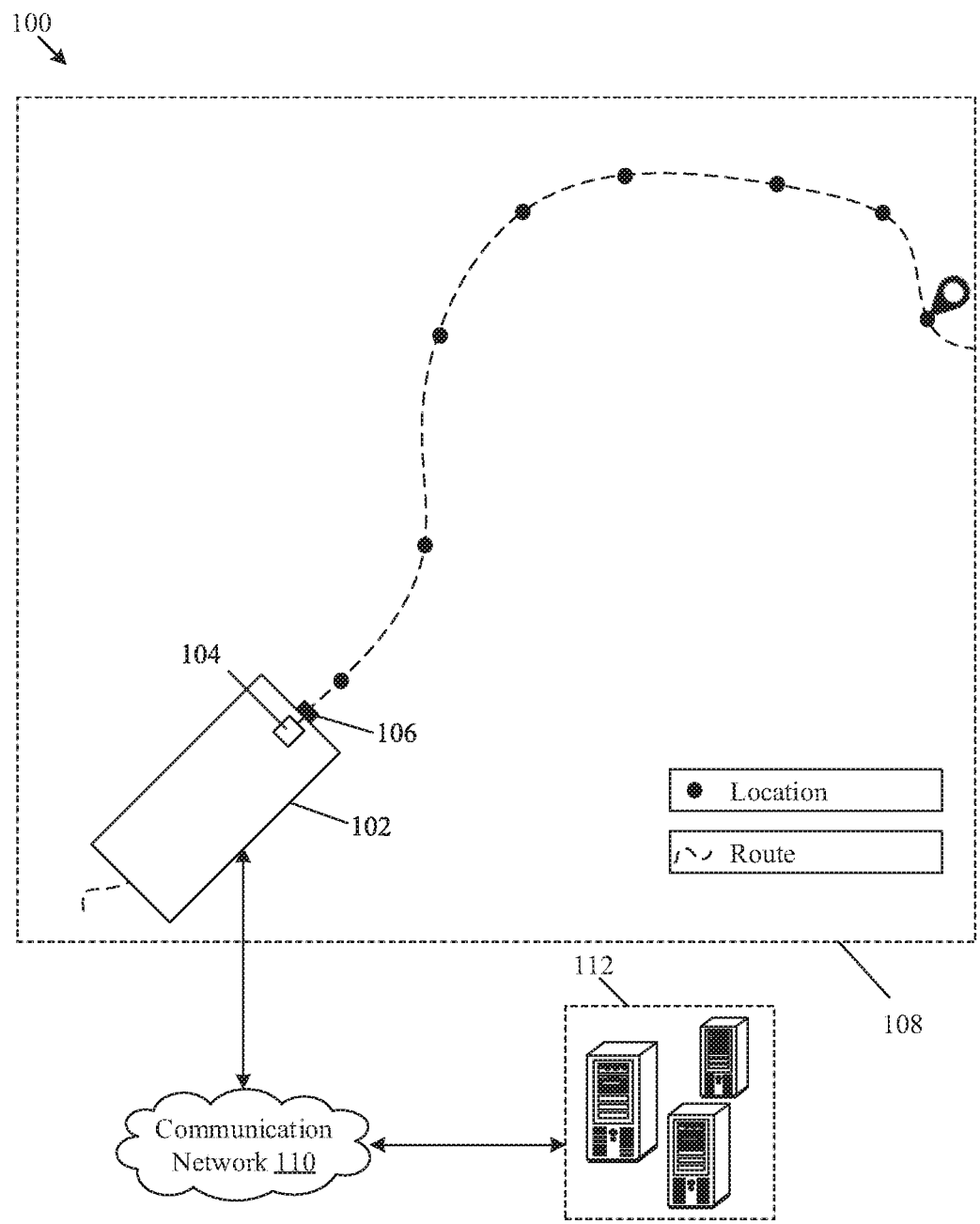
FIG. 1 is a block diagram that illustrates a network environment for on-chip compensation of rolling shutter effect in an imaging sensor of a vehicle, in accordance with an embodiment of the disclosure.

Certain embodiments of the disclosure may be found in a system and method for on-chip compensation of rolling shutter effect in an imaging sensor located on a vehicle. Various embodiments of the disclosure provide a system that may include a memory device, an imaging sensor, and a plurality of circuits coupled to the imaging sensor and the memory device. The plurality of circuits may be configured to generate motion vector information for a plurality of speed values of the vehicle at each location of a plurality of locations of a specified route of the vehicle. At each of the plurality of locations on the specified route, the plurality of circuits may be further configured to derive an image-kernel for each of the plurality of speed values of the vehicle. Alternatively stated, a plurality of image-kernels may be derived for the plurality of speed values of the vehicle at each location. Each image-kernel may be derived based on the generated motion vector information for the plurality of speed values of the vehicle at each location of the plurality of locations of the specified route. A successive location of the vehicle may be predicted at a current location of the vehicle. The successive location may be predicted based on the generated motion vector information for a current speed value of the vehicle at the current location on the specified route. Thus, the motion vector information is used not only to predict successive locations of the vehicle, but also to generate an image kernel array (i.e., to derive the image-kernel for each of the plurality of speed values of the vehicle). The plurality of circuits may be further configured to capture a first image at the predicted successive location on the specified route. Specifically, the imaging sensor may capture the first image, which exhibits a shift of a plurality of pixels caused by the rolling shutter effect. Additionally, a second image may be generated from the captured first image based on a compensation of the shift of the plurality of pixels in the captured first image. The compensation may be performed within the imaging sensor and such shift may be compensated by the derived image-kernel for the predicted successive location of the vehicle.

In accordance with an embodiment, the compensation of the shift of the plurality of pixels of the captured first image may be on-chip compensation within the imaging sensor. The second image may be compensated for the rolling shutter effect caused in the captured first image. The compensation of the shift of the plurality of pixels of the captured first image may be a line-by-line compensation of the captured first image. The line-by-line compensation may correspond to a sequential compensation for each pixel-array of the captured first image. In accordance with an embodiment, the compensation of the shift of the plurality of pixels of the captured first image may be a global compensation of the captured first image. The global compensation may correspond to a concurrent compensation for different pixel-arrays for the captured first image.

In accordance with an embodiment, the plurality of circuits may be further configured to retrieve the specified route from a navigation device communicatively coupled to the plurality of circuits for navigation of the vehicle. In accordance with an embodiment, the imaging sensor may be a complementary metal-oxide-semiconductor (CMOS) sensor. The vehicle may be an autonomous vehicle or a semi-autonomous vehicle.

In accordance with an embodiment, the plurality of circuits may be further configured to store the derived image-kernel for each speed value of the plurality of speed values and for each location of the plurality of locations on the specified route. The derived image-kernel may be stored in the memory device. The plurality of circuits may be further configured to transfer the derived image-kernel for the predicted successive location of the vehicle. The derived-image kernel may be transferred within the imaging sensor at the current location of the vehicle on the specified route. In accordance with an embodiment, the derived image-kernel may include a plurality of filter coefficients for the on-chip compensation of the captured first image.

In accordance with an embodiment, the plurality of circuits may be further configured to select the derived image-kernel for the predicted successive location. The derived image-kernel may be selected based on the current location and the current speed value of the vehicle on the specified route. The successive location of the vehicle on the specified route may be further predicted based on the generated motion vector information during motion of the vehicle on the specified route.

In accordance with an embodiment, the plurality of circuits may be further configured to compute the motion vector information at each speed value and at each location on the specified route. The motion vector information may be calculated based on a difference of location coordinates of a first location and corresponding location coordinates of a second location on the specified route. Such first location and the second location on the specified route may be selected based on each speed value of the plurality of speed values of the vehicle for the specified route.

In accordance with an embodiment, the shift of the plurality of pixels of the captured first image may be a circular shift of each pixel of the plurality of pixels in a corresponding pixel-array of the captured first image. The shift of the plurality of pixels in a corresponding pixel-array of the captured first image may be constant. Additionally, the shift of the plurality of pixels in a plurality of pixel-arrays of the captured first image may vary based on a step-size. Such step-size may be based on the current speed value and the generated motion vector information for the current location of the vehicle on the specified route.

In accordance with an embodiment, the plurality of circuits may be further configured to receive a pixel-array of the captured first image from the imaging sensor. An image-kernel array from the derived plurality of image-kernels may be selected within the imaging sensor for the received pixel-array of the captured first image. The plurality of circuits may generate a shift-compensated pixel-array of the captured first image within the imaging sensor. The shift-compensated pixel-array may be generated based on a transformation of the received pixel-array by the selected image-kernel array of the plurality of derived image-kernels. Thereafter, the shift-compensated pixel-array may be updated in an integrated memory of the imaging sensor for each of a plurality of pixel-arrays of the captured first image. An updated image may be obtained based on the update of the shift-compensated pixel-array for each of the plurality of pixel-arrays of the captured first image. The updated image may be associated a region within a first resolution of the updated image that may correspond to a plurality of undesired pixels. In accordance with an embodiment, the plurality of circuits may be further configured to remove a region from the updated image that may correspond to the plurality of undesired pixels of the updated image. Therefore, the second image may be obtained post cropping of the region from the updated image. In accordance with an embodiment, the plurality of circuits may be further configured to populate the region with pixel values lying adjacent to the region that may correspond to the plurality of undesired pixels in the updated image. Therefore, the second image may be obtained post populating the region from the updated image with pixel values lying adjacent to the region.

In accordance with an embodiment, the plurality of circuits may be further configured to capture, by the imaging sensor having a first resolution, a scaled pixel-array at the predicted successive location on the specified route. A first pixel-array may be selected having a second resolution from the scaled pixel-array. The selection may be based on the shift of the plurality of pixels in the corresponding scaled pixel-array. The scaled pixel-array may be associated with the first resolution that may be greater than a second resolution. The first resolution may correspond to a resolution of the imaging sensor and the second resolution may correspond to a resolution of the second image. The plurality of circuits may be further configured to update the first pixel-array in the integrated memory of the imaging sensor for each captured pixel-array to obtain the second image.

FIG. 1 is a block diagram that illustrates an exemplary network environment for on-chip compensation of rolling shutter effect in an imaging sensor of a vehicle, in accordance with an embodiment of the disclosure. With reference to FIG. 1, there is shown a network environment 100. The network environment 100 may include a vehicle 102. The vehicle 102 includes an electronic control unit (ECU) 104 and an image-capture device 106. The vehicle 102 may navigate in an operational environment 108 from a first location to a second location, via a specified route, as shown. The network environment 100 may further include a server 112 and a communication network 110. The vehicle 102 may be communicatively coupled to the server 112, via the communication network 110.

The vehicle 102 may be a fully autonomous or a semi-autonomous vehicle. In some embodiments, the vehicle 102 may be a non-autonomous vehicle. The vehicle 102 may comprise the ECU 104 that may be communicatively coupled to the image-capture device 106, via an in-vehicle network. Examples of the vehicle 102 may include, but are not limited to, a motor vehicle, a hybrid vehicle, a drone (or Unmanned Aerial Vehicle (UAV)), planes, and/or a vehicle 102 that uses one or more distinct renewable or non-renewable energy sources. A vehicle 102 that uses renewable or non-renewable energy sources for propulsion may include petroleum products fueled vehicle, a fully electrically powered vehicle, a gas fueled vehicle, a solar-powered vehicle, and/or a vehicle powered by other forms of alternative energy sources.

The ECU 104 may comprise suitable logic, circuitry, interfaces, and/or instructions that may be configured to execute operations for compensation of image(s) that are captured by the image-capture device 106 and affected by the rolling shutter effect. Such image(s) may be captured by an imaging sensor of the image-capture device 106 during motion of the vehicle 102 on a specified route. The imaging sensor may be communicatively coupled with the ECU 104. The ECU 104 may be further configured to share computational resources, such as instructions or outputs, with the image-capture device 106. The ECU 104 may be communicatively coupled with an in-vehicle network, such as a vehicle area network (VAN), an in-vehicle data bus, and a controller area network (CAN) bus to share outputs (or images) produced after compensation with the other ECUs of the vehicle 102.

The ECU 104 may be communicatively coupled with other ECU(s) of the vehicle 102, which may be further configured to access, monitor, or regulate a plurality of operational parameters of the vehicle 102, such as speed, engine temperature, air pressure, fuel or charge level, and power and torque delivered. In addition, the plurality of operational parameters may include a separation between the vehicle 102 and obstacles, a relative speed of objects in vicinity of the vehicle 102, a predicted path of the mobile machines, such as a land-based vehicle (e.g., a car), an air-based vehicle (e.g., an aircraft or a drone), or a water-craft, in vicinity of the vehicle 102, and the like.

The image-capture device 106 may comprise suitable logic, circuitry, interfaces, and/or instructions that may be configured to capture and store images captured at different locations on the specified route. The images may be captured during motion of the vehicle 102 on the specified route. Additionally, the image-capture device 106 may be configured to execute instructions and operations for on-chip compensation of the images captured at different locations on the specified route. The image-capture device 106 may include at least the imaging sensor, a set of lenses, a processor, and a memory. The imaging sensor of the image-capture device 106 may comprise a sensor core and a plurality of registers communicatively coupled with the sensor core, the processor, the memory, and the ECU 104 by a register bus interface. In accordance with an embodiment, the imaging sensor may be implemented in the image-capture device 106 as a complementary metal-oxide-semiconductor (CMOS) sensor. In such an implementation, the imaging sensor may be configured to execute line-by-line scanning or scanning of pixel-arrays of defined size at a time. Alternatively stated, the imaging sensor may implement rolling shutters to scan and capture a view visible from the vehicle 102 based on horizontal or vertical line-by-line scanning of a view of the operational environment 108 of the vehicle 102.

The operational environment 108 for the vehicle 102 may be an environment for navigation of the vehicle 102 along the specified route. The plurality of locations on the specified route may be part of the operational environment 108. The operational environment 108 may change based on the type of vehicle 102. For example, the operational environment 108 for a land-borne vehicle, such as cars, trucks, bikes, and train, may comprise roads, off-road terrain, and rail tracks. The operational environment 108 for a watercraft (vessel) or a water-borne vehicle, such as a ship, a boat, or a submarine, may be a waterway, such as sea, rivers, and canals. The operational environment 108 for an air-borne vehicle, such an aircraft, an unmanned aerial vehicle or a drone, and a helicopter, may comprise airways. The airways may be further segregated into altitude blocks based on defined use of the air-borne vehicle. For example, a drone for surveillance of a "1 $mile^2$" region of land may fly at an altitude of "1000 Feet" above ground and therefore, the operational environment 108 may be defined by a definite block of airways at a given altitude.

The communication network 110 may comprise suitable logic, circuitry, and interfaces that may be configured to provide a plurality of network ports and a plurality of communication channels for transmission and reception of communication data. Each network port may correspond to a virtual address (or a physical machine address) for transmission and reception of the communication data. The communication network 110 may include a medium through which the vehicle 102 may communicate with other communication devices, such as the server 112, and/or one or more other vehicles. Examples of the communication network 110 may include, but are not limited to, a dedicated short-range communication (DSRC) network, a mobile ad-hoc network (MANET), a vehicular ad-hoc network (VANET), Intelligent vehicular ad-hoc network (InVANET), Internet based mobile ad-hoc networks (IMANET), a wireless sensor network (WSN), a wireless mesh network (WMN), the Internet, a cellular network, such as a long-term evolution (LTE) network, a cloud network, a Wireless Fidelity (Wi-Fi) network, and/or a Wireless Local Area Network (WLAN). Various devices in the network environment 100 may be configured to connect to the communication network 110, in accordance with various wireless communication protocols. Examples of such wireless communication protocols may include, but are not limited to, IEEE 802.11, 802.11, 802.15, 802.16, 1609, Worldwide Interoperability for Microwave Access (Wi-MAX), Wireless Access in Vehicular Environments (WAVE), cellular communication protocols, Transmission Control Protocol and Internet Protocol (TCP/IP), User Datagram Protocol (UDP), Hypertext Transfer Protocol (HTTP), Long-term Evolution (LTE), File Transfer Protocol (FTP), ZigBee, EDGE, infrared (IR), and/or Bluetooth (BT) communication protocols.

The server 112 may comprise suitable logic, circuitry, and interfaces that may be configured to generate the specified route for navigation of the vehicle 102 based on request received from a navigation device of the vehicle 102. In some embodiments, the server 112 may be a special-purpose maps server reserved exclusively for the requests for route estimation from the vehicle 102. Alternatively, the server 112 may be a third party server accessible to both vehicles and suitable communication devices, such as mobile phones, tablets, phablets, and the like, for route estimation. The estimation of the specified route for the vehicle 102 may be an optimum estimation factored on the basis of an estimated minimum travel time, a low congestion path, and checkpoints (locations) estimated to be crossed by the vehicle 102 in a specified route.

In operation, a navigation device of the vehicle 102 may receive a defined input from a user associated with the vehicle 102. The defined input may be associated with one or more navigation parameters for the vehicle 102. The user may provide the defined input by at least one of an interface available on the vehicle 102, such as an interface of an infotainment head unit. Example of the interfaces in the vehicle 102 may include, but are not limited to, voice-enabled interfaces, touch-enabled interfaces, remote-controlled interfaces, mobile enabled interfaces, gesture based interfaces, or haptic based interfaces. The defined input may be provided before a journey of the vehicle 102 or during the journey of the vehicle 102 on the specified route or an undefined route. In accordance with an embodiment, the defined input for the vehicle 102 may comprise a destination address. The destination address may be interpreted by the navigation device of the vehicle 102 or the server 112 associated with the vehicle 102 to a corresponding location on a map. In such an implementation, the navigation device may be configured to derive a location of the vehicle 102 and further provide the derived location of the vehicle 102 and the destination address to the server 112 for route estimation.

In accordance with another embodiment, the defined input for the vehicle 102 may comprise a destination address and a vehicle control time associated with the vehicle 102. In such an implementation, the navigation device may be configured to derive a current location of the vehicle 102 and provide the derived location of the vehicle 102 and the destination address to the server 112 for route estimation. The specified route for autonomous or semi-autonomous control may be estimated for the vehicle control time associated with the vehicle 102. For example, a user initially driving the vehicle 102 towards a destination on the map may switch to auto-pilot mode or autonomous control for "30 minutes" for certain reasons. Therefore, the navigation device may derive the specified route for at least the next 30 minutes and autonomous operating mode may be activated for "30 minutes" for the vehicle 102.

In accordance with an embodiment, the defined input for the vehicle 102 may comprise a specific area, a region, or a territory to be covered by the vehicle 102. Alternatively stated, the vehicle 102 may be assigned a specific area or region to be covered by the vehicle 102. For example, a UAV may be assigned a specific area of "10 $Km^2$" for surveillance applications. The UAV may be configured to scan a defined portion of territory by following the specified route and within a defined airway block. Alternatively, the UAV may be configured to scan the defined portion of territory by following the specified route derived between different checkpoints within the specific area.

The specified route may be stored digitally as geographical information system (GIS) data in the navigation device of the vehicle 102. The GIS data for the specified route may describe roads, space, turns, or other objects by polylines or polygons associated with a plurality of nodes. For example, a "street 332" may be divided in multiple segments with each segment represented by polylines or polygons connected with nodes at either end of the segment. The specified route may be a path joining a first location and a second location on a map. The navigation device in the vehicle 102 may be configured to request for the specified route between the first location and the second location on the map. The specified route may be derived in conjunction with the server 112 that may be communicatively coupled with the vehicle 102, via the communication network 110. The navigation device may be configured to generate a request for generation of the specified route for given locations. In accordance with an embodiment, the generated request may be transferred to the server 112 for derivation of the specified route. Further, the navigation device may receive the specified route and associated metadata for the specified route from the server 112. In accordance with another embodiment, the request may be transferred to a route estimation circuitry (not shown) present locally in the vehicle 102. The specified route may be further stored in the navigation device before a call (or control signal) for the specified route may be raised from either of the ECU 104 or the navigation device Although, it has been described that the navigation device may store a single specified route for given first location and second location. However, the disclosure may not be so limiting and the navigation device may store alternate routes for the given first location and the second location.

The ECU 104 of the vehicle 102 may be configured to retrieve the specified route for the vehicle 102 from the navigation device of the vehicle 102. The ECU 104 may be configured to store the specified route and associated metadata for the specified route in the memory associated with the ECU 104. A plurality of locations, such as Global Positioning System (GPS) coordinates, may be estimated from the specified route of the vehicle 102. The techniques for estimation of GPS coordinates may be known to one skilled in the art, and therefore, further description for the estimation of the plurality of locations has been omitted for the sake of brevity.

The ECU 104 of the vehicle 102 may be further configured to generate motion vector information for a plurality of speed values of the vehicle 102 at each location of the estimated plurality of locations on the specified route. The plurality of speed values may be selectively sorted speed values for the vehicle 102 from possible speed values. The plurality of speed values may be adaptively selected for different segments of the specified route. For example, for a turn, the speed values may be low, such as "5 miles/hour", "10 miles/hour", and "15 miles hour", for a straight stretch of a road, the speed values may be more sparsely distributed or widely distributed, such as "10 miles/hour", "20 miles/hour", "30 miles/hour", "40 miles/hour", and "50 miles/hour".

The motion vector information may be utilized to predict successive locations of the vehicle 102 during motion on the specified route. The motion vector information may be generated prior to initialization of autonomous or semi-autonomous operating mode in the vehicle 102 on the specified route. Alternatively, the motion vector information may be further generated prior to start of the journey or motion of the vehicle 102 on the specified route.

At each location of the estimated plurality of locations on the specified route, the ECU 104 may be further configured to derive an image-kernel based on the motion vector information for each of the plurality of speed values of the vehicle 102. In other words, a plurality of image-kernels may be derived for the plurality of speed values of the vehicle 102 at each location. Alternatively stated, one image kernel may be valid or used for one speed value of different possible speed values at a specific location, and a single image-kernel may be used for compensation at a time. Each derived image-kernel may comprise a plurality of filter coefficients for each pixel-array (row or column) of images that may be thereafter captured by the image-capture device 106. The plurality of filter coefficients may be represented by a matrix of filter coefficients of a defined order, for example, an order of (100,100). Each image-kernel may be utilized for compensation of images affected by the rolling shutter effect. The plurality of image-kernels for each location may be further derived prior to initialization of autonomous or semi-autonomous operating mode in the vehicle 102. The initialization of the autonomous or semi-autonomous operating mode or control of the vehicle 102 may be executed during the motion of the vehicle 102 or before the start of the journey of the vehicle 102 on the specified route. Alternatively, the plurality of image-kernels for each location may be derived before a start of the journey or motion of the vehicle 102 on the specified route.

As the vehicle 102 moves on the specified route, the ECU 104 may be further configured to measure a current speed value at a current location of the vehicle 102 on the specified route. For the measured current location and the current speed value, the ECU 104 may retrieve the generated motion vector information for the current location and the corresponding current speed value of the vehicle 102. The motion vector information may provide an estimated direction of motion of the vehicle 102. Thus, the ECU 104 may be configured to predict a successive location of the vehicle 102 on the specified route based on the generated motion vector information. In accordance with an embodiment, the successive location is predicted such that a change in direction of motion, or speed value of the vehicle 102 is minimal. The predicted successive location may be approximate successive location of the vehicle 102 on the specified route. A deviation may exist between the predicted successive location and an actual successive location of the vehicle 102. The deviation may be caused by numerous factors associated with the vehicle 102 in motion en route on the specified route, such as speed breakers, tolls, barricades, traffic signals, traffic jams, and/or other vehicles that may block the specified route for the vehicle 102.

In accordance with an embodiment, at each successive location, the ECU 104 may be configured to transmit control signals to the image-capture device 106. Upon reception of the control signals from the ECU 104, the image-capture device 106 may be configured to scan a view available from the vehicle 102 at the successive location. The scan may be further executed in a rolling shutter mode of the image-capture device 106. In the rolling shutter mode, a single line or a pixel-array (vertical columns or horizontal rows) may be captured by the image-capture device 106. A first image may be generated by the image-capture device 106 based on continuously scanning the view at each successive location of the vehicle 102 on the specified route.

In accordance with an embodiment, at each successive location, the ECU 104 may be configured to retrieve a first image from a video captured by the image-capture device 106 during motion of the vehicle 102 on the specified route. The first image may be retrieved from a set of frames of the video, and the ECU 104 may select the first image having a minimal loss of quality. The first image may be associated with a shift of a plurality of pixels of the first image. Such shift may be caused by the rolling shutter effect, which during motion of the vehicle 102 on the specified route. Such shift may be significantly evident along borders of the first image. For example, each pixel in the first row of the first image may be shifted from an expected pixel position by "1", and each pixel in each subsequent row (or pixel-arrays) of the first image may be shifted from the expected pixel position by a step size, such as 1, 2, 3, and 4. The shift of pixel position, is shown and described, for example, in FIG. 5B.

The ECU 104 may be configured to select one of the derived plurality of image-kernels in accordance with the current speed value and the predicted successive location of the vehicle 102 on the specified route. The selected image-kernel may be used to compensate for the rolling shutter effect in the captured first image. The ECU 104 may be configured to transfer the selected image-kernel for on-chip compensation of the captured first image to the imaging sensor of the image-capture device 106, via register level buses and interfaces between the ECU 104 and the imaging sensor.

In some embodiments, the image-capture device 106 may comprise suitable circuitry for independently processing the transferred kernel and the captured first image. In accordance with an embodiment, the image-capture device 106 may be configured to execute line-by-line compensation of each row or column (or pixel-arrays) of pixels captured by the imaging sensor of the image-capture device 106. Each row or column of the image may be captured sequentially within a read-out register of the imaging sensor. The image-capture device 106 may be further configured to transform the captured row or column of the first image with a corresponding row or column (linear array) of the selected image-kernel. The transformation may be executed within the imaging sensor of the image-capture device 106, and therefore the compensation may be executed in real time or near-real time. In accordance with another embodiment, the image-capture device 106 may be configured to execute compensation of the plurality of pixels concurrently in the first image.

The image-capture device 106 may be further configured to generate a second image in real time or near-real time based on the on-chip compensation of the captured first image. The generated second image may exhibit a minimal shift in the plurality of pixels. In certain implementation, the generated second image may exhibit a zero shift in the plurality of pixels. Alternatively stated, the generated second image may exhibit a significant improvement in image quality having minimal noise and distortions caused by the motion of the vehicle 102 on the specified route. The image-capture device 106 may be further configured to transmit the second image post compensation of the first image in real time or near-real time. The second image may be transmitted to the ECU 104 of the vehicle 102.

It may be noted that the aforementioned operations of the ECU 104 and the image-capture device 106 may be executed in tandem such that an aggregate delay in capturing a first pixel-array and compensating the captured first pixel-array of the first image may be minimal. Such aggregate delay may not be reciprocated to other image-dependent operations of the vehicle 102. The detailed operation of the ECU 104 and the imaging sensor has been described, for example, in FIG. 3.

Figure 2:
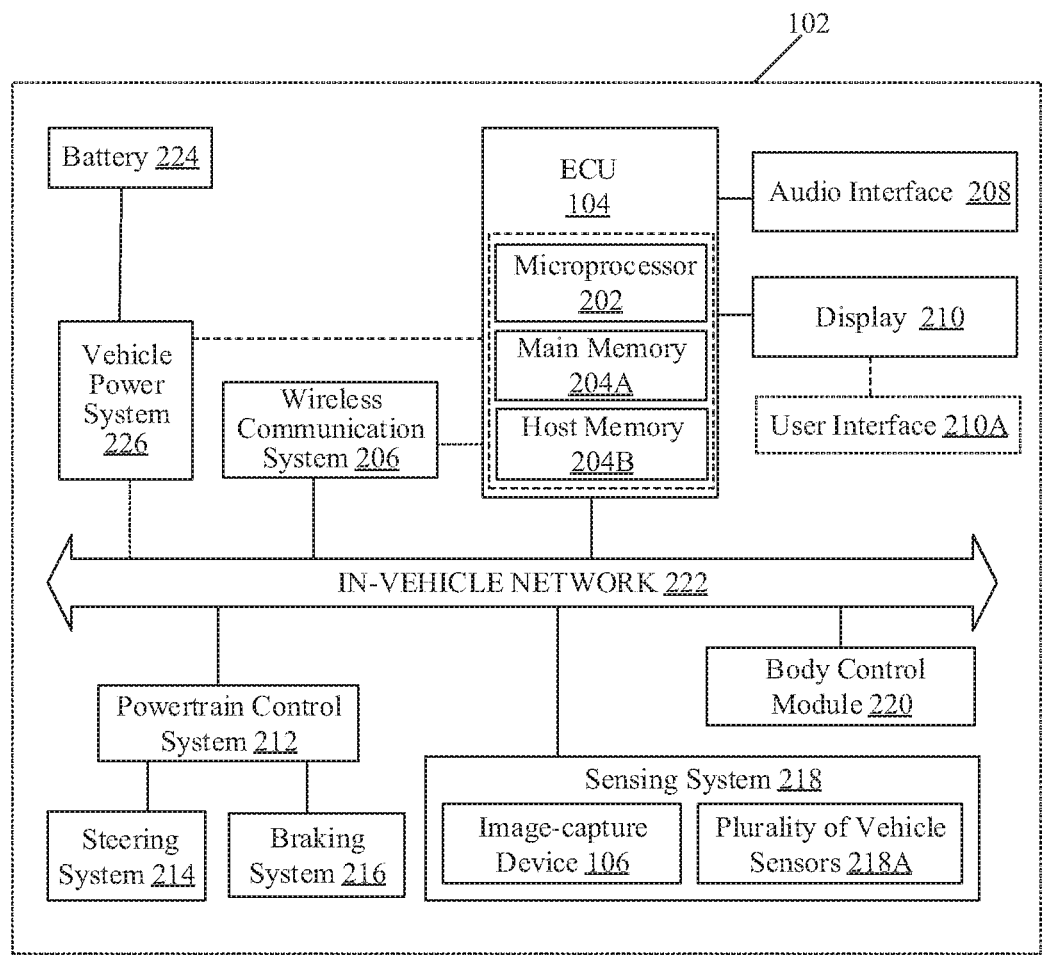
FIG. 2 is a block diagram that illustrates various exemplary components or systems of a vehicle, in accordance with an embodiment of the disclosure.

FIG. 2 is a block diagram that illustrates various exemplary components or systems of a vehicle, in accordance with an embodiment of the disclosure. FIG. 2 is explained in conjunction with elements from FIG. 1. With reference to FIG. 2, there is shown the vehicle 102. The vehicle 102 may comprise the ECU 104 that may include a microprocessor 202, a main memory 204A and a host memory 204B. The vehicle 102 may further comprise a wireless communication system 206, an audio interface 208, a display 210, a powertrain control system 212, a steering system 214, a braking system 216, a sensing system 218, a body control module 220, and an in-vehicle network 222. The sensing system 218 may comprise the image-capture device 106 and a plurality of vehicle sensors 218A. The display 210 may render a user interface (UI) 210A. There is also shown a battery 224 associated with a vehicle power system 226 in the vehicle 102. In accordance with an embodiment, the wireless communication system 206, the audio interface 208 and the display 210 may also be associated with the ECU 104.

The various components or systems may be communicatively coupled to each other, via the in-vehicle network 222, such as a vehicle area network (VAN), and/or an in-vehicle data bus. The microprocessor 202 may be communicatively coupled to the main memory 204A and the host memory 204B, the wireless communication system 206, the audio interface 208, the display 210, the powertrain control system 212, the sensing system 218, and the body control module 220, via the in-vehicle network 222.

The microprocessor 202 may comprise suitable logic, circuitry, and interfaces that may be configured to execute a set of instructions stored in the main memory 204A. The microprocessor 202 may be configured to retrieve the specified route from the navigation device and store the retrieved route in the main memory 204A. The microprocessor 202 may be further configured to generate motion vector information for a plurality of speed values of the vehicle 102 at each location of a plurality of locations on the retrieved route. The microprocessor 202 may be further configured to derive an image-kernel for each of the plurality of speed values of the vehicle 102 at each location of the plurality of locations on the retrieved route. In other words, a plurality of image-kernels may be derived for the plurality of speed values of the vehicle 102 at each location. Alternatively stated, one image kernel is valid or used for one speed value of different possible speed values at a specific location, and a single image-kernel may be used for compensation at a time. Thereafter, the microprocessor 202 may be further configured to communicate control signals (or instructions) to the image-capture device 106 of the sensing system 218 for the on-chip compensation. Examples of the microprocessor 202 may be a Reduced Instruction Set Computing (RISC) processor, an Application-Specific Integrated Circuit (ASIC) processor, a Complex Instruction Set Computing (CISC) processor, an Explicitly Parallel Instruction Computing (EPIC) processor, a Very Long Instruction Word (VLIW) processor, a microcontroller, a central processing unit (CPU), a graphics processing unit (GPU), a state machine, and/or other processors or circuits.

The main memory 204A may comprise suitable logic, circuitry, and/or interfaces that may be configured to store a set of instructions executable by the microprocessor 202 and other computational resources for the microprocessor 202. The main memory 204A may be configured to store the specified route, retrieved from the navigation device of the vehicle 102. The main memory 204A may be further configured to store images outputted post compensation by the image-capture device 106. Examples of implementation of the main memory 204A may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory.

The host memory 204B may comprise suitable logic, circuitry, and/or interfaces that may be configured to store the generated motion vector information and the derived plurality of image-kernels for the plurality of speed values of the vehicle 102 at each location of the plurality of locations on the specified route. The host memory 204B may refer to a memory device that may be embedded within the ECU 104 of the vehicle 102. The host memory 204B may facilitate near real time transfer of one of the derived plurality of image-kernels to the imaging sensor within the image-capture device 106. The host memory 204B may be based on one of a Static Random Access Memory (SRAM) architecture, a Dynamic Random Access Memory (DRAM) architecture, a Static-Dynamic Random Access Memory (SDRAM) architecture, and/or other fast Read/Write (R/W) or Input/output (I/O) memory architectures. Additionally, the host memory 204B may be a cache memory of enhanced size fabricated within the microprocessor 202.

The wireless communication system 206 may comprise suitable logic, circuitry, and/or interfaces that that may be configured to communicate with one or more external devices, such as the server 112, one or more cloud servers, and/or one or more vehicles. Such communication with the one or more external devices may occur via the communication network 110. The wireless communication system 206 may include, but is not limited to, an antenna, a telematics unit, a radio frequency (RF) transceiver, one or more amplifiers, one or more oscillators, a digital signal processor, a near field communication (NFC) circuitry, a coder-decoder (CODEC) chipset, and/or a subscriber identity module (SIM) card. The wireless communication system 206 may communicate via wireless communication, such as a dedicated short-range communication (DSRC) protocol, via the communication network 110.

The audio interface 208 may be connected to a speaker, a chime, a buzzer, or other device that may be operable to generate a sound. The audio interface 208 may also be connected to a microphone or other device(s) to receive a voice input from a user associated with the vehicle 102, such as a driver. The audio interface 208 may be further communicatively coupled to the microprocessor 202. The audio interface 208 may be a part of an in-vehicle infotainment (IVI) system or a head unit of the vehicle 102.

The display 210 may comprise a display circuitry associated with a display screen to display various types of information to one or more users associated with the vehicle 102. The display 210 may be communicatively coupled to the microprocessor 202. Examples of the display 210 may include, but are not limited to a heads-up display (HUD) or a head-up display with an augmented reality system (AR-HUD), a driver information console (DIC), a projection-based display, a display of the infotainment head unit, a see-through display, a smart-glass display, and/or an electrochromic display. The display circuitry associated with the display 210 of the vehicle 102 may further include other input/output (I/O) devices to communicate with the microprocessor 202.

The UI 210A may be used to render the generated second image or the captured first image graphically on the display 210, under control of the microprocessor 202. The display 210 may render a two-dimensional (2D) or a three-dimensional (3D) graphical view of the generated second image or the captured first image, via the UI 210A.

The powertrain control system 212 may refer to an onboard computer of the vehicle 102 that may control operations of an engine and a transmission system of the vehicle 102. The powertrain control system 212 may control an ignition, fuel injection, emission systems, and/or operations of a transmission system (when provided) and the braking system 216.

The steering system 214 may be associated with the powertrain control system 212. The steering system 214 may include a steering wheel and/or an electric motor (provided for a power-assisted steering) that may be used by the one or more users to control movement of the vehicle 102 in manual mode or a semi-autonomous mode (driver assistance mode). In accordance with an embodiment, the movement or steering of the vehicle 102 may be automatically controlled when the vehicle 102 is in autonomous mode (also referred to as self-driving mode). Examples of the steering system 214 may include, but are not limited to, an autonomous steering control, a power-assisted steering system, a vacuum/hydraulic-based steering system, an electro-hydraulic power-assisted system (EHPAS), or a "steer-by-wire" system, known in the art.

The braking system 216 may be used to decelerate or stop the vehicle 102 en route the specified route based on application of at one of frictional forces, drag and lift. The braking system 216 may be configured to receive a command from the powertrain control system 212 under the control of the microprocessor 202, when the vehicle 102 is in an autonomous mode or a semi-autonomous mode.

The sensing system 218 may comprise the image-capture device 106 and the plurality of vehicle sensors 218A installed within the vehicle 102. The image-capture device 106 of the sensing system 218 may be configured to capture a field-of-view (FOV) of the operational environment 108 (See FIG. 1) in vicinity of the vehicle 102. The FOV may comprise a front, a back, a side, a top, or a bottom FOV, and/or FOV at defined angles from the vehicle 102. The sensing system 218 may be operatively connected to the microprocessor 202 to provide input signals. One or more communication interfaces, such as a CAN interface, may be provided in the sensing system 218 to connect to the in-vehicle network 222. Examples of the sensing system 218 may include, but are not limited to, a vehicle speed sensor, an odometer, a yaw rate sensor, a speedometer, a GPS, a steering angle detection sensor, a vehicle motion direction detection sensor, a magnetometer, an image sensor, a touch sensor, an infrared sensor, a radio wave-based object detection sensor, and/or a laser-based object detection sensor. The plurality of vehicle sensors 218A of the sensing system 218 may be configured to detect a direction of travel, geospatial position, steering angle, yaw rate, speed, and/or rate-of-change of speed of the vehicle 102.

The body control module 220 may refer to another electronic control unit (ECU) that comprises suitable logic, circuitry, interfaces, and/or code that may be configured to control various electronic components or systems of the vehicle 102, such as a central door locking system. The body control module 220 may relay the command to other suitable vehicle systems or components, such as the central door locking system, for access control of the vehicle 102.

The in-vehicle network 222 may include a medium through which various control units, components, or systems of the vehicle 102, such as the ECU 104, the wireless communication system 206, the powertrain control system 212, the sensing system 218, and/or the body control module 220, may communicate with each other. In accordance with an embodiment, in-vehicle communication of audio/video data for multimedia components may occur by use of Media Oriented Systems Transport (MOST) multimedia network protocol of the in-vehicle network 222. The in-vehicle network 222 may facilitate access, control and/or communication between the ECU 104 and other ECU(s), such as an ECU of the wireless communication system 206. Various devices in the vehicle 102 may be configured to connect to the in-vehicle network 222, in accordance with various wired and wireless communication protocols. One or more communication interfaces, such as the CAN interface, a Local Interconnect Network (LIN) interface, may be used by various components or systems of the vehicle 102 to connect to the in-vehicle network 222. Examples of the wired and wireless communication protocols for the in-vehicle network 222 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The battery 224 may be a source of electric power for one or more electric circuits or loads (not shown) associated with the vehicle 102. For example, the loads may include, but are not limited to various lights, such as headlights and interior cabin lights, electrically powered adjustable components, such as vehicle seats, mirrors, windows or the like, and/or other in-vehicle infotainment system, such as radio, speakers, electronic navigation system, electrically controlled, powered and/or assisted steering, such as the steering system 214. The battery 224 may be a rechargeable battery. In accordance with an embodiment, the battery 224 may be a source of electrical power to the ECU 104 (shown by dashed lines), the one or more sensors of the sensing system 218, and/or one or hardware units, such as the display 210, of the in-vehicle infotainment system. In accordance with an embodiment, the battery 224 may be a source of electrical power to start an engine of the vehicle 102 by selectively providing electric power to a propulsion system (not shown) of the vehicle 102. As for an electric vehicle, the battery 224 may further provide a rated power to each operational component, such as engine, infotainment, lightings, air conditioning, and various components/device of the vehicle 102.

The vehicle power system 226 may be configured to measure and regulate availability and distribution of an uninterrupted power from the battery 224 to various electric circuits and loads of the vehicle 102, as described above. The vehicle power system 226 may be further configured to optimally charge the battery 224 and adaptively manage loading of the battery 224. The vehicle power system 226 may provide a required voltage to each operational component of the vehicle. The vehicle power system 226 may further enable the vehicle 102 to utilize the power of the battery 224 for a required time when the vehicle 102 is a hybrid vehicle or an autonomous vehicle. In accordance with an embodiment, the vehicle power system 226 may correspond to a power electronics system, and may include a microcontroller that may be communicatively coupled (shown by dotted lines) to the in-vehicle network 222. The microcontroller may receive command from the powertrain control system 212 under the control of the microprocessor 202.

In operation, a user associated with the vehicle 102 may provide an instruction (programmatically) based on a control routine specified for the vehicle 102. The instruction may be received, via the user interface 210A of the vehicle 102. The instruction may configure the vehicle 102 for a travelling to a destination on a map or covering a specific region of a geographical territory. The vehicle 102 may be configured to handle one or more tasks, such as logistics and goods transport, personalized travel, commercial travel, surveillance, security, patrol, and/or other defense related task.

The vehicle 102 may receive the instruction from the user prior to the journey of the vehicle 102 on the specified route. Alternatively, the vehicle 102 may receive the instruction from the user when the vehicle 102 may be en route on the specified route or undefined route. The instruction may be associated with a request for initialization of a level of control of the vehicle 102 for the specified route and/or for a vehicle control time for the specified route. Levels of control of the vehicle 102, as defined by National Highway Traffic Safety Administration (NHTSA), comprises an SAE Level 0 for no automation, SAE level 1 for driver assistance, SAE Level 2 for partial automation, SAE Level 3 of conditional automation, SAE Level 4 of high automation, and SAE Level 5 of full automation.

Based on the instruction, the other ECU(s) may transfer control signals to the vehicle power system 226 to initialize the operational components of the vehicle 102, which may be required for the aforesaid level of control of the vehicle 102. The vehicle power system 226, in conjunction with the battery 224, may provide a rated power to at least the wireless communication system 206, the display 210, the powertrain control system 212, the steering system 214, the braking system 216, the sensing system 218, and the body control module 220.

The ECU 104, the image-capture device 106, and the navigation device (of the wireless communication system 206) may be further initialized to pre-process the specified route for generation of motion vector information for different locations and for different possible speed values of the vehicle 102. In accordance with an embodiment, the microprocessor 202 of the ECU 104 may be configured to receive a defined input from the user associated with the vehicle 102. The defined input may be associated with one or more navigation parameters for the vehicle 102. The defined input for the vehicle 102 may comprise at least one of a destination address, a vehicle control time and/or a specific area or a region of territory to be covered by the vehicle 102.

In accordance with an embodiment, the microprocessor may be further configured to transmit a request to the server 112 for generation of the specified route for the defined input from the user, via the communication network 110. The microprocessor may be further configured to retrieve the specified route and associated metadata, stored digitally as the GIS data, from the wireless communication system 206 of the vehicle 102. The microprocessor 202 may be configured to store the specified route and associated metadata for the specified route in the main memory 204A of the ECU 104.

In accordance with an embodiment, the microprocessor 202 of the vehicle 102 may be further configured to generate the motion vector information for a plurality of speed values of the vehicle 102 at each location of the estimated plurality of locations on the specified route. The motion vector information may be utilized to predict successive locations during journey of the vehicle 102 on the specified route.

In accordance with an embodiment, based on motion vector information, the microprocessor 202 may be further configured to derive an image-kernel for the plurality of speed values of the vehicle 102 at each location of the estimated plurality of locations on the specified route. In other words, a plurality of image-kernels may be derived for the plurality of speed values of the vehicle 102 at each location. Alternatively stated, one image kernel is valid or used for one speed value of different possible speed values at a specific location, and a single image-kernel may be used for compensation at a time. Each image-kernel may be derived based on the generated motion vector information for the plurality of speed values of the vehicle 102 at each location of the estimated plurality of locations on the specified route. The microprocessor 202 may be further configured to store the derived plurality of image-kernels in the host memory 204B for the plurality of speed values of the vehicle 102 at each location of the estimated plurality of locations on the specified route.

As the vehicle 102 moves on the specified route, the microprocessor 202 may be further configured to measure a current speed value at a current location of the vehicle 102 on the specified route. The current speed value may be measured in near real time by a speed sensor 312 of the sensing system 218 and the current location may be measured in near real time by a location sensor 310 of the sensing system 218. The microprocessor 202 may retrieve the generated motion vector information for the current location and the corresponding current speed value of the vehicle 102. The microprocessor 202 may be configured to predict a successive location of the vehicle 102 on the specified route based on the retrieved motion vector information for the current location.

In accordance with an embodiment, the microprocessor 202 may be further configured to transmit control signals to the sensing system 218, via the in-vehicle network 222. The control signals may be transmitted to the sensing system 218 for capturing a first image of a view available at each successive location on the specified route. The control signals may be routed to the image-capture device 106 of the sensing system 218.

In accordance with an embodiment, the image-capture device 106 may be configured to progressively scan a view available from the vehicle 102 at the successive location. The progressively scanned view may correspond to capturing of a row or column of pixels of the first image at a time. In accordance with an embodiment, the image-capture device 106 may be configured to fetch the first image from a video captured during motion of the vehicle 102 on the specified route. The first image may be associated with a shift of a plurality of pixels of the first image. Such shift may be caused by the rolling shutter effect, which may be evident during motion of the vehicle 102 on the specified route.

In accordance with an embodiment, the microprocessor 202 may be further configured to select one of the derived plurality of image-kernels in accordance with the current speed value and the predicted successive location of the vehicle 102 on the specified route. The derived image-kernel may be selected for near real time compensation of the captured first image affected by the rolling shutter effect. The microprocessor 202 may be configured to transfer the selected image-kernel to the imaging sensor of the image-capture device 106, via the in-vehicle network 222. The selected image-kernel may be transferred for the on-chip compensation of the captured first image.

In accordance with an embodiment, the image-capture device 106 may be further configured to execute line-by-line compensation of each row or column (or pixel-arrays) of pixels captured by the imaging sensor of the image-capture device 106. The image-capture device 106 may be further configured to transform the captured row or column of the first image with a corresponding row or column (linear array) of the selected image-kernel. The image-capture device 106 may be further configured to generate a second image in the near real time and from the on-chip compensation of the captured first image. The generated second image may exhibit a minimal shift in the plurality of pixels.

In accordance with an embodiment, the microprocessor 202 may be further configured to transfer the generated second image to the other ECU(s) associated with the vehicle power system 226, the powertrain control system 212, steering system 214, braking system 216, and other imaging devices in the sensing system 218. The generated second image may be transferred for calibration and control of different operational parameters, such as speed, acceleration, power, relative separation between the vehicle 102 and objects in vicinity, fuel level, temperature, differential voltage levels, and objectives associated with the operational parameters. Examples of the objectives may include, but are not limited to, turning the vehicle 102 on turns, maintaining distance from mobile machines, measuring relative speed of different mobile machines, and predicting accidental zones and mobile machines en route. The mobile machine may be a land-based vehicle, such as a car, a watercraft, or an air-borne vehicle, such as an aircraft, a drone, a plane, and the like.

In accordance with an embodiment, a microprocessor (not shown) associated with the sensing system 218 may be further configured to communicate sensor data associated with the vehicle 102 to different operational components of the vehicle 102, via the in-vehicle network 222. Additionally, the sensor data may be transferred on the server 112, via the wireless communication system 206 and the communication network 110. The sensor data may correspond to signals received by the microprocessor 202 from the sensing system 218, such as the RADAR, LIDAR and/or the image-capture device 106, installed in the vehicle 102. The communicated sensor data may comprise a direction of travel, a current lane information, vehicle-type, an engine temperature, a power level, a current speed value, a current location, an interior temperature of the vehicle, a drag, an air pressure in tires of the vehicle 102, vehicle size, vehicle weight, a geospatial location, a steering angle, a yaw rate, and/or a vehicle acceleration. The communicated sensor data may further comprise fault and debug logs generated during the journey of the vehicle 102. The vehicle-type may correspond to certain information, such as a model number or a brand name set by a car manufacturer. The vehicle-type may further correspond to a category based on the vehicle size, such as a truck, a compact car, a Sport Utility Vehicle (SUV). The vehicle-type may further correspond to characteristics of the vehicle 102, such as an electric vehicle (EV), an internal combustion engine (ICE) vehicle, an unsupervised autonomous vehicle capable of intelligently sensing the operational environment 108, a vehicle operated by a human driver, a vehicle with an advanced driving assisted system, a semi-autonomous vehicle, a vehicle capable of vehicle-to-vehicle communication, a vehicle incapable of vehicle-to-vehicle communication, a taxi, or a rental car.

In accordance with an embodiment, the microprocessor 202 may be configured to automatically control one or more components or systems, such as the powertrain control system 212, the steering system 214, the braking system 216, the sensing system 218, and/or the body control module 220 of the vehicle 102 based on the levels of control defined for the vehicle 102.

Figure 3:
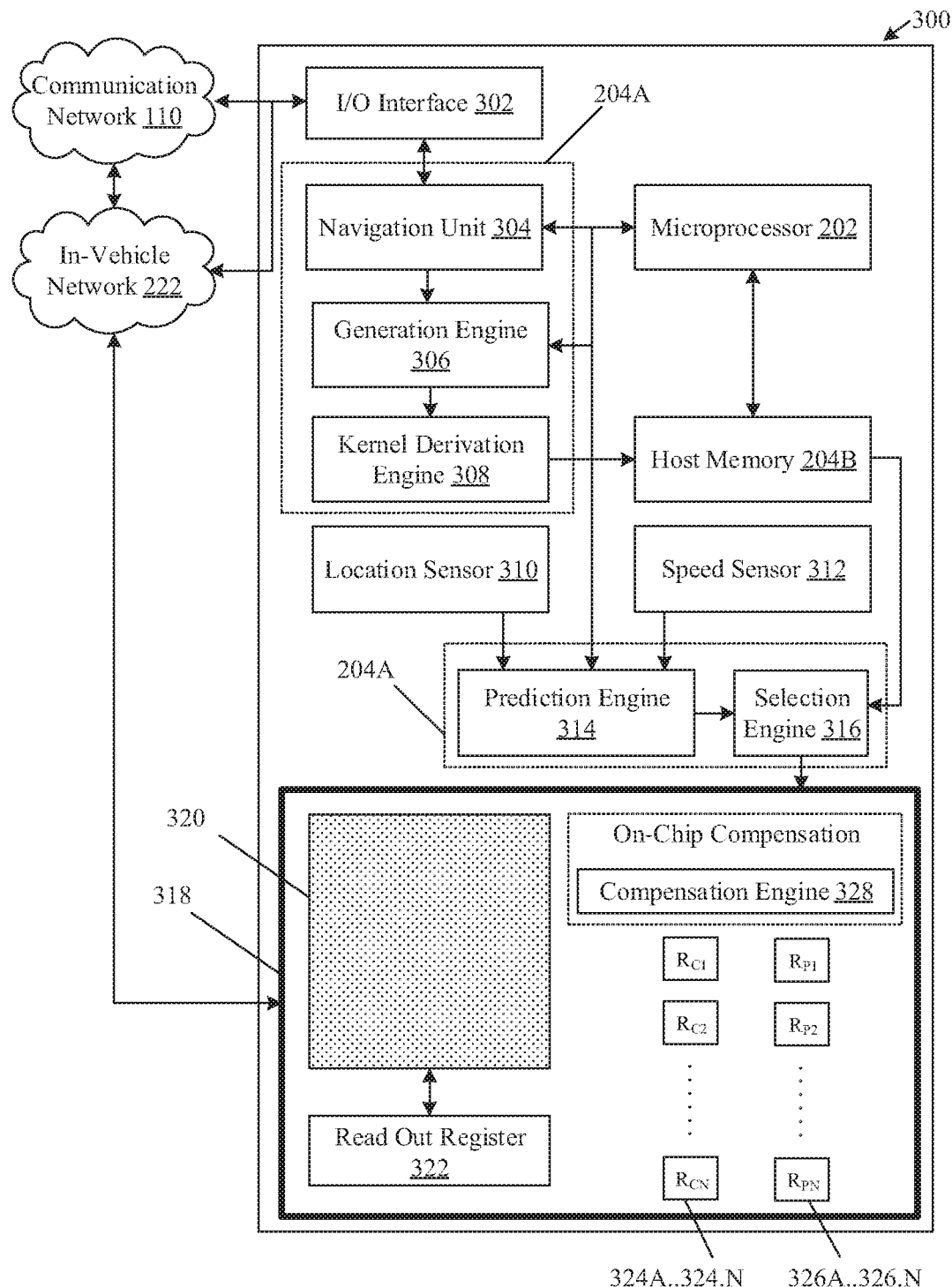
FIG. 3 is a block diagram that illustrates an exemplary system for on-chip compensation of rolling shutter effect in an imaging sensor of the vehicle of FIG. 2, in accordance with an embodiment of the disclosure.

FIG. 3 is a block diagram that illustrates an exemplary system for on-chip compensation of rolling shutter effect in an imaging sensor of a vehicle, in accordance with an embodiment of the disclosure. Referring to FIG. 3, there is shown an image-capture system 300 that comprises an (Input/Output) I/O interface 302, the microprocessor 202, the main memory 204A, the host memory 204B, a location sensor 310, a speed sensor 312, and an imaging sensor 318 of the image-capture device 106. The main memory 204A of the image-capture system 300 may store various computational engines, such as a navigation unit 304, a generation engine 306, a kernel derivation engine 308, a prediction engine 314, and a selection engine 316. Alternatively, the navigation unit 304, the generation engine 306, the kernel derivation engine 308, the prediction engine 314, and the selection engine 316 may be specialized circuits implemented on one of a specialized computational circuitry, a programmable logic device, or a digital signal processing circuitry. The image-capture system 300 may be communicatively coupled to the aforementioned operational components of the vehicle 102 (described in FIG. 2), via the in-vehicle network 222. Additionally, the image-capture system 300 may be communicatively coupled to the server 112, via the communication network 110.

The I/O interface 302 may comprise suitable logic, circuitry, interfaces, and/or code that may be configured to communicate with other systems or circuitry present within the image-capture system 300 and/or peripheral to the image-capture system 300. The I/O interface 302 may be implemented by use of known technologies to support wired or wireless communication, via the communication network 110. Components of the I/O interface 302 may include, but are not limited to, an antenna, a radio frequency (RF) transceiver, one or more amplifiers, a tuner, one or more oscillators, a digital signal processor, a coder-decoder (CO-DEC) chipset, a subscriber identity module (SIM) card, and/or a local buffer.

The navigation unit 304 may comprise suitable logic, circuitry, interfaces, and/or code that may be configured to retrieve a specified route for navigation of the vehicle 102 via the in-vehicle network 222. The specified route may correspond to an estimated path (made of directed graphs) that may be continuously joined by nodes (or locations as points) on a map. The navigation unit 304 may be configured to derive a plurality of locations from the specified route. The plurality of locations may be GPS locations such that each GPS location may be an ordered pair (latitude, longitude) of a latitude (in degrees) and longitude (in degrees). For an air-borne vehicle, height values may be further derived in addition to the GPS locations on the map. The navigation unit 304 may be communicatively coupled with the generation engine 306, to transfer the derived plurality of locations from the specified route to the generation engine 306.

The generation engine 306 may comprise suitable logic, circuitry, interfaces, and/or code that may be configured to generate motion vector information for each location of the derived plurality of locations of the specified route of the vehicle 102. For each location, the generation engine 306 may generate the motion vector information at a plurality of speed values of the vehicle 102. The plurality of speed values may be the possible speed values for one location estimated based on the specified route of the vehicle 102 and current speed of the vehicle 102. In accordance with an embodiment, the generation engine 306 may be implemented based on code stored in the main memory 204A of the image-capture system 300. In accordance with an embodiment, the generation engine 306 may be implemented as a standalone circuitry associated with the main memory 204A and the host memory 204B of the image-capture system 300. Further, the generation engine 306 may be communicatively coupled to the kernel derivation engine 308 and the generated motion vector information may be transmitted to the kernel derivation engine 308. The generated motion vector information may be stored in a tabular database in the host memory 204B having a structured or an unstructured data schema.

The kernel derivation engine 308 may comprise suitable logic, circuitry, interfaces, and/or code that may be configured to derive, at each location of the plurality of locations on the specified route, an image-kernel for each of the plurality of speed values of the vehicle 102. In other words, a plurality of image-kernels may be derived for the plurality of speed values of the vehicle 102 at each location. Alternatively stated, one image kernel is valid or used for one speed value of different possible speed values at a specific location, and a single image-kernel may be used for compensation at a time. Each image-kernel may be derived based on the generated motion vector information for the plurality of speed values of the vehicle 102 and the plurality of locations on the specified route. Each image-kernel may be a kernel matrix of a plurality of filter coefficients derived to transform images captured by the imaging sensor 318 during motion of the vehicle 102. In accordance with an embodiment, the kernel derivation engine 308 may be implemented based on code stored in the main memory 204A of the image-capture system 300. In accordance with an embodiment, the kernel derivation engine 308 may be implemented as a standalone circuitry associated with the main memory 204A and the host memory 204B of the image-capture system 300. Further, the kernel derivation engine 308 may be communicatively coupled to the host memory 204B, such as SRAM. The kernel derivation engine 308 may be further configured to store the derived plurality of image-kernels for the plurality of speed values of the vehicle 102 and the plurality of locations on the specified route in the host memory 204B. The derived image-kernel may be stored in another tabular database having a structured or an unstructured data schema.

The location sensor 310 may comprise suitable logic, circuitry, interfaces, and/or code that may be configured to estimate a current location of the vehicle 102 en route on a route, such as the specified route. The current location may be represented as a pair of latitude and longitude values, estimated from location coordinates available from a navigation chip embedded in the image-capture system 300 or present in a remotely located system. In accordance with an embodiment, the location sensor 310 may be a GPS receiver, and the location coordinates corresponds to GPS coordinates received from a constellation of GPS navigation satellites. In accordance with another embodiment, the location sensor 310 may be a System-On-Chip (SOC) sensor operating independent of communication from the GPS, and may estimate the current location based on one of gyroscopes, odometers and accelerometers.

The speed sensor 312 may comprise suitable logic, circuitry, interfaces, and/or code that may be configured to estimate a current speed value of the vehicle 102 en route on a route, such as the specified route. In accordance with an embodiment, the current speed value may be an instantaneous value of the speed of the vehicle 102 at the estimated current location of the vehicle 102. In accordance with another embodiment, the current speed value may be an average or weighted average speed value from one or more instantaneously captured speed values from the speed sensor 312. The speed sensor 312 may be implemented in at least one component of the vehicle 102, such as wheels, gear system, ignition system, vehicle chassis, vehicle shaft, differentials, and/or axles. Examples of the speed sensor 312 may include, but are not limited to, a wheel-based Hall Effect (HE) sensor, a gear-based reed-type sensor, a tachometer, a camera-based speed sensor, and a location-based speed sensor. Alternatively, the speed sensor 312 may be implemented by use of an external system, such as satellites or antenna circuitry, remotely measuring instantaneous speed value of the vehicle 102 at estimated current locations.

The prediction engine 314 may comprise suitable logic, circuitry, interfaces, and/or code that may be configured to predict, at the current location of the vehicle 102, a successive location of the vehicle 102. The successive location may be predicted based on the generated motion vector information for the estimated current speed value of the vehicle 102 at the estimated current location on a route, which may be the specified route. In accordance with an embodiment, the prediction engine 314 may be implemented based on code stored in the main memory 204A of the image-capture system 300. In accordance with an embodiment, the prediction engine 314 may be implemented as a standalone circuitry associated with the main memory 204A and the host memory 204B of the image-capture system 300. Further, the prediction engine 314 may be communicatively coupled to the host memory 204B, such as SRAM. The prediction engine 314 may be further configured to store the predicted successive location in at least one of the main memory 204A or the host memory 204B of the image-capture system 300.

The selection engine 316 may comprise suitable logic, circuitry, interfaces, and/or code that may be configured to select one of the derived plurality of image-kernels for the predicted successive location of the vehicle 102. The selection of the derived image-kernel may be based on the estimated current location and the estimated current speed value of the vehicle 102 on the specified route. Alternatively stated, the selection of the derived image-kernel may be based on the generated motion vector information for the current location and the current speed value of the vehicle 102. The derived image-kernel may be selected from a stored database of derived image-kernels in the host memory 204B. The selected image-kernel may be used to optimally model the filter coefficients required to compensate for distortions in images affected by the rolling shutter effect, which may be caused by motion of the vehicle 102. In accordance with an embodiment, the selection engine 316 may be implemented based on code stored in the main memory 204A of the image-capture system 300. In accordance with an embodiment, the selection engine 316 may be implemented as a standalone circuitry associated with the main memory 204A and the host memory 204B of the image-capture system 300.

The imaging sensor 318 may comprise suitable logic, circuitry, interfaces, and/or code that may be configured to capture a sequence of images, such as a video or images, such as a first image of a view visible from a mounting position of the image-capture device 106 at the vehicle 102. The imaging sensor 318 may capture the sequence of images, such as the video, or the images, while the vehicle 102 is in motion. The imaging sensor 318 may be further configured to execute on-chip compensation of images affected by the rolling shutter effect. In accordance with an embodiment, the imaging sensor 318 may be implemented as an active pixel sensor, such as a complementary metal oxide (CMOS) sensor. In such an implementation, the imaging sensor 318 may be configured to execute progressive scan (line-by-line) of each row or column of pixels (1D Pixel-array) on a sensor core of the CMOS sensor. The progressive scan may be a vertical scan (column wise) or a horizontal scan (row wise). In accordance with an embodiment, the imaging sensor 318 may be implemented as one of an oversampled binary image sensor, a planar Fourier capture array (PFCA), and a back-illuminated (BSI or BI) sensor. The imaging sensor 318 may comprise a sensor core 320, a read-out register 322, a plurality of current image-kernel registers 324A . . . 324N, a plurality of predicted image-kernel registers 326A . . . 326N, and a compensation engine 328. The imaging sensor 318 may be installed in a package configuration, which may further specify a form factor of the imaging sensor 318 in the image-capture system 300. Examples of the package configuration may include, but are not limited to, System on Chip (SoC)-based configuration, Field programmable gate arrays (FPGA)-based configuration, complex programmable logic device (CPLD)-based configuration, System in package (SiP)-based configuration, and Programmable System on Chip (PSoC)-based configuration. Although not shown, the imaging sensor 318 may further comprise a specialized microprocessor (or a microcontroller), and a memory, and/or a graphic processing unit (GPU), integrated with the imaging sensor 318.

The sensor core 320 may comprise suitable logic, circuitry, interfaces, and/or code that may be configured to capture excitations caused by illumination at an array of pixel-level circuitry, and generate an image that may correspond to the captured excitations. In accordance with an embodiment, the sensor core 320 may comprise a matrix of photodiodes actively coupled with active charge amplifiers on a substrate. Hereinafter, the matrix of photodiodes associated with the active charge amplifiers on the substrate may be referred to as a pixel matrix of the sensor core 320. In other words, the sensor core 320 may comprise an array of pixel-level circuitry, arranged in a plurality of rows and a plurality of columns. Each of the plurality of rows and each of the plurality of columns may be further associated a selection line, also referred to as a row selector or a column selector, respectively. An order of the pixel matrix of the sensor core 320 may describe a first resolution (in pixels) of the imaging sensor 318 or the image-capture device 106. In accordance with an embodiment, the first resolution of the imaging sensor 318 may be different from a second resolution of the image outputted by the imaging sensor 318. Such an implementation of the imaging sensor 318 has been further described in description of FIG. 6.

The read-out register 322 may comprise suitable logic, circuitry, interfaces, and/or code that may be configured to capture and hold a pixel-array of a plurality of pixels, such as a row or a column of pixels, from the pixel matrix of the sensor core 320. The read-out register 322 may be an n-bit register for storing digital values of the captured pixel-array. A size of the read-out register 322 may be associated with a size for storage of pixel values of the captured pixel-array. The size may correspond to a storage capacity of the read-out register 322 for storage of pixels values, transferred from a row or a column of the array of pixel-level circuitry in the sensor core 320. In accordance with an embodiment, the size of the read-out register 322 may be equal to a width (of the first resolution) of the sensor core 320. In such an implementation, the entire row or column of pixels from the sensor core 320 may be flushed to the read-out register 322 at a time. In accordance with another embodiment, the size of the read-out register 322 may be different from the first resolution of the sensor core 320. In such implementation, the sensor-core 320 may be modified to exhibit a resolution, which may be different from the size (or a resolution) of the read-out register 322 for storage of an entire column of a row of pixel values. Such an implementation has been described in FIG. 6 in detail.

The plurality of current image-kernel registers 324A . . . 324N may be specialized registers (also shown as RC1, RC2 . . . RCN) in the imaging sensor 318 for storage of the transferred image-kernel for the estimated current location of the vehicle 102. Accordingly, the plurality of predicted image-kernel registers 326A . . . 326N (also shown as RP1, RP2 . . . RPN), may be specialized registers in the imaging sensor 318 for storage of the transferred image-kernel for the predicted successive location of the vehicle 102. Each of the plurality of current image-kernel registers 324A . . . 324N, and the plurality of predicted image-kernel registers 326A . . . 326N may be m-bit registers of a length equal to a length of each derived image-kernel.

The compensation engine 328 may comprise suitable logic, circuitry, interfaces, and/or code that may be configured to compensate for the shift of a plurality of pixels in the captured images from the sensor core 320 of the imaging sensor 318. The compensation may be done based on a transformation of the plurality of pixels captured during the motion of the vehicle 102. In accordance with an embodiment, the compensation engine 328 may be configured for a serialized (or sequential/progressive) compensation of the captured image, such as line-by-line (row or column wise) compensation. In accordance with an embodiment, the compensation engine 328 may be configured for concurrent compensation of the captured images entirely in a single operation cycle without recurrence or iteration. Alternatively stated, in some embodiment, one image may be compensated at one time instant without multiple iterations. In some embodiment, all captured images may be compensated concurrently in a parallel process. In accordance with an embodiment, the compensation engine 328 may be implemented based on code stored in the integrated memory (not shown) of the imaging sensor 318. In accordance with an embodiment, the compensation engine 328 may be implemented as a standalone circuitry associated with the integrated memory of the imaging sensor 318. The compensation engine 328 may be communicatively coupled to the integrated memory and the compensation engine 328 may be further configured to store and update the compensated register values, such as shift-compensated pixel-arrays, in the integrated memory of the imaging sensor 318.

In operation, control signals may be received at the I/O interface 302 of the image-capture system 300 in response to a defined input from a user associated with the vehicle 102. The defined input may be associated with one or more navigation parameters for the vehicle 102. The defined input for the vehicle 102 may comprise at least one of a destination address, a vehicle 102 control time and/or a specific area or a region/territory to be covered by the vehicle 102 (as described in FIG. 1). In response to the defined input, the navigation unit 304 may be further configured to retrieve a specified route from the navigation unit 304 communicatively coupled to the image-capture system 300. The specified route may be retrieved for navigation and journey of the vehicle 102 along the specified route. The navigation unit 304 may be further configured to estimate a plurality of locations (as location coordinates) from the retrieved route for the vehicle 102. Alternatively stated, a plurality of location coordinates may be computed for a plurality of points, which may be nodes or randomly distributed points on the specified route.

Each estimated location of the plurality of locations may be separated from adjacent points by a displacement value, measured in degrees or distance metrics, such as miles, or meters. In accordance with an embodiment, the displacement value may be an adaptive displacement value that may be derived based on a defined criteria for selection of points on the specified route. The defined criteria for selection of points on the specified route comprises a first rule for selecting more points when a section of the specified route may cause frequent changes in orientation, direction, or acceleration of the vehicle 102. For example, a section of the specified route may include cross slopes or cambers, low mobility corridors, choke points, chicanes, open curb extension, cornices, intersections, and/or other non-linear and graded profile of the specified route. The defined criteria may comprise a second rule for sparsely selecting points on the specified route when the specified route is straight or causes insignificant changes in orientation, direction or acceleration of the vehicle 102. For example, a section "S1", a section "S2", and a section "S3" of a specified route "R1" may exhibit an "S" profile, a straight profile, and a "U" profile, respectively. The navigation unit 304 may be configured to select more points, such as 30 location points and "25" location points, on the "S" profiled section "S1" and the "U" profiled section "S3" of the specified route "R1", respectively. Accordingly, the navigation unit 304 may be configured to select less points, "5" location points, on the straight profile section "S2". The selected location points may be further associated with an adaptive displacement value, such as "1 feet" for the "S" profile section "S1", "5 feet" for the straight profiled section "S2", and "2.5 feet" for the "U" profiled section "S3" of the specified route "R1".

In accordance with another embodiment, the displacement value may be a constant value uniformly present between each pair of points on the specified route. For example, a route "R2" may be associated with "X" equally spaced location points with each location point separated from neighboring location points by 1 feet, or some defined separation, where "X" is a positive integer value. Accordingly, the navigation unit 304 may be further configured to estimate a plurality of speed values for each estimated location of the estimated plurality of locations of the specified route. The plurality of speed values for each estimated location may correspond to a possible speed value of the vehicle 102 at the corresponding location on the specified route.

In accordance with an embodiment, the plurality of speed values may be estimated adaptively for each section of the specified route in accordance with possible frequent variations in direction and/or orientation of the vehicle 102 on the specified route. For example, a turn section on a specified route may be associated with lower speed values, for example, 5 miles/hour, 7 miles/hour and 9 miles/hour, whereas a straight section of the specified route may be associated with higher speed values, for example, "10 miles/hour", "20 miles/hour", "30 miles/hour", and "40 miles/hour". Therefore, the navigation unit 304 may estimate lower speed values with lower differences among each estimated speed value and estimate higher speed values with greater differences among each estimated speed value.

In accordance with an embodiment, the plurality of speed values may be estimated non-adaptively for each section of the specified route. The non-adaptive estimation of the plurality of speed values may be further associated with a specific relationship among the estimated plurality of speed values, for example, estimating speed values based on an arithmetic progression (AP) of speed values. Such an estimation may be an approximate estimation due to deviations for possible frequent variations in direction and/or orientation of the vehicle 102 on the specified route. For example, a section on a specified route may be associated with speed values following an AP, for example, N, 2N, 3N, and 4N, where N may be an initial reference speed value for the specific section of the specified route. Therefore, for an initial reference speed value of 5 miles/hour, remnant speed values may be estimated as "2×5 miles/hour" ("10 miles/hour"), "3×5 miles/hour" ("15 miles/hour") and "4×5 miles/hour" ("20 miles/hour"). The aforesaid speed estimation techniques may further provide computational support during derivation of motion vector information for different locations and for different speed values for each of the different locations, as described below. The estimated plurality of locations and the estimated plurality of speed values may be further transmitted to the generation engine 306 of the image capturing system.

The generation engine 306 may be configured to receive the plurality of locations and associated plurality of speed values for each location of the plurality of locations. Thereafter, the generation engine 306 may be further configured to generate motion vector information for the plurality of speed values of the vehicle 102 at each location of the plurality of locations of the specified route. The motion vector information may be computed (or generated) at each speed value and at each location on the specified route based on a difference of location coordinates of a first location and corresponding location coordinates of a second location on the specified route.

The motion vector information at each speed value and at each location may correspond to a motion vector for the vehicle 102 on the specified route. The motion vector may be an ordered pair of a first location identifier and a second location identifier at each location and at each speed value of the vehicle 102 on the specified route. The first location identifier may be derived based on a difference of a latitude of the second location and a corresponding latitude of the first location on the specified route. Accordingly, the second location identifier may be derived based on a difference of a longitude of the second location and a corresponding longitude of the first location on the specified route. Alternatively stated, a difference of location coordinates of a first location and corresponding location coordinates of a second location on the specified route, may provide motion vector information at each location. For example, there is shown below a table 1 that provides a tabular representation of motion vectors (or motion vector information) for a first speed of N miles/hour) and a second speed of 2N miles/hour. The table 1 provides a first column for location index (LC), a second column for a latitude (LT) of the location, a third column for a longitude (LN) of the location, a fourth and a sixth column for the first location identifier ($MV_X$) of the motion vector at speed values of N miles/hour and 2N miles/hour, a fifth and a seventh column for the second location identifier ($MV_Y$) of the motion vector at speed values of N miles/hour and 2N miles/hour, respectively.

TABLE 1

| LC | Latitude (LT) Degrees | Longitude (LN) Degrees | For Speed Value = N miles/hour Motion Vector | | For Speed Value = 2N miles/hour Motion Vector | |
|---|---|---|---|---|---|---|
| | | | $MV_X$ | $MV_Y$ | MV_X | MV_Y |
| 1 | 77.69183419 | 12.92984374 | 2.28E−06 | 3.43E−05 | 2.37E−05 | 4.36E−05 |
| 2 | 77.69183647 | 12.92987799 | 2.14E−05 | 9.33E−06 | 5.52E−05 | 1.78E−05 |
| 3 | 77.69185784 | 12.92988732 | 3.38E−05 | 8.50E−06 | 3.98E−05 | 3.48E−06 |
| 4 | 77.69189168 | 12.92989582 | 5.91E−06 | −5.02E−06 | 4.88E−06 | −1.47E−05 |
| 5 | 77.69189759 | 12.9298908 | −1.00E−06 | −9.63E−06 | 1.97E−05 | 4.92E−06 |
| 6 | 77.69189656 | 12.92988117 | 2.08E−05 | 1.46E−05 | 4.07E−05 | 2.76E−05 |
| 7 | 77.69191733 | 12.92989572 | 1.99E−05 | 1.30E−05 | 3.04E−05 | 2.34E−05 |
| 8 | 77.69193725 | 12.92990875 | 1.05E−05 | 1.04E−05 | 1.96E−05 | 1.00E−05 |
| 10 | 77.69194776 | 12.9299191 | 9.09E−06 | −3.40E−07 | 2.36E−05 | 1.65E−05 |
| 11 | 77.69195685 | 12.92991876 | 1.45E−05 | 1.68E−05 | 2.70E−05 | 2.61E−05 |
| 12 | 77.69197134 | 12.92993557 | 1.25E−05 | 9.30E−06 | 6.30E−07 | 3.71E−05 |
| 13 | 77.6919838 | 12.92994487 | −1.20E−05 | 2.78E−05 | −5.99E−06 | 3.84E−05 |
| 14 | 77.69197197 | 12.92997269 | 5.84E−06 | 1.06E−05 | 5.30E−06 | 2.02E−05 |
| 15 | 77.69197781 | 12.92998328 | −5.40E−07 | 9.65E−06 | 5.97E−06 | 1.88E−05 |
| 16 | 77.69197727 | 12.92999293 | 6.51E−06 | 9.13E−06 | 7.81E−06 | 1.34E−05 |
| 17 | 77.69198378 | 12.93000206 | 1.30E−06 | 4.23E−06 | 2.04E−05 | −4.14E−06 |

With reference to the table 1, for a speed value of N miles/hour, the motion vector ($MV_X$, $MV_Y$) for a location index (LC) of "1" may be evaluated as:

$$MV_X(LC=1)=(77.69183647-77.69183419)=2.28E-06 \text{ Degrees}$$

$$MV_Y(LC=1)=(12.92987799-12.92984374)=3.43E-05 \text{ Degrees}$$

With reference to the table 1, for a speed value of 2N miles/hour, the motion vector ($MV_X$, $MV_Y$) for a location index (LC) of "1" may be evaluated as:

$$MV_X(LC=1)=(77.69185784-77.69183419)=2.37E-05 \text{ Degrees}$$

$$MV_Y(LC=1)=(12.92988732-12.92984374)=4.36E-05 \text{ Degrees}$$

As shown above, the first location and the second location on the specified route may be selected based on each speed value of the plurality of speed values of the vehicle 102 for the specified route. Alternatively stated, for generation of the motion vector information, the first location and the second location may be adaptively selected for different speed values of the vehicle 102. For example, for the motion vector at speed value of "N miles/hour", the longitude, and latitude of the second location corresponding to a location index of "2" may be selected. Accordingly, for the motion vector at speed value of "2N miles/hour", the longitude and latitude of the second location corresponding to a location index of "3" may be selected. The generation engine 306 may be further configured to iteratively compute the differences of latitudes and longitudes for each of the plurality of locations. A total number of motion vectors (NMv) may be equal to "P times Q" (or PQ), where "P" may be a number of locations and "Q" may be a number of speed values. The generation engine 306 may be further configured to store the generated motion vector information for each estimated speed value of the vehicle 102 at each of the plurality of locations. The generated motion vector information may be stored in the main memory 204A of the image-capture system 300.

The kernel derivation engine 308 may be configured to retrieve the generated motion vector information for each estimated speed value of the vehicle 102 at each of the plurality of locations of the specified route. The generated motion vector information may be retrieved from the main memory 204A of the image-capture system 300. Thereafter, at each of the plurality of locations on the specified route, the kernel derivation engine 308 may be configured to derive an image-kernel for each of the plurality of speed value of the vehicle 102. In other words, a plurality of image-kernels may be derived for the plurality of speed values of the vehicle 102 at each location. Alternatively stated, one image kernel may be valid or used for one speed value of different possible speed values at a specific location, and a single image-kernel may be used for compensation at a time. Each derived image-kernel includes a plurality of filter coefficients, arranged as a kernel-matrix having an order equivalent to a first resolution of the imaging sensor 318. A relationship may be detected between the generated motion vector information and a probable shift in a plurality of pixels of images that may be captured from the vehicle 102. Each image-kernel may be derived on the basis of the generated motion vector information. In accordance with an embodiment, a kernel coefficient (or kernel value) for a pixel-array corresponding to a row or column of pixels of the imaging sensor 318 may be evaluated from a corresponding motion vector information for a specific location.

In one example, an image-kernel ($K_C$) for the location index (LC) in the table 1 may be given by equation (1) as:

$$\begin{bmatrix} 0 & 0 & 0 & 0 & 0 & 0 & 0 & 0 & \dots \\ 1 & 1 & 1 & 1 & 1 & 1 & 1 & 1 & \dots \\ 2 & 2 & 2 & 2 & 2 & 2 & 2 & 2 & \dots \\ 3 & 3 & 3 & 3 & 3 & 3 & 3 & 3 & \dots \\ 4 & 4 & 4 & 4 & 4 & 4 & 4 & 4 & \dots \\ 5 & 5 & 5 & 5 & 5 & 5 & 5 & 5 & \dots \\ \vdots & \vdots & \vdots & \vdots & \vdots & \vdots & \vdots & & \vdots \end{bmatrix} = K_C \quad (1)$$

where each row or column of the image-kernel ($K_C$) may include a row or column of kernel coefficients for a corresponding pixel-array (or row/column) of pixels of the imaging sensor 318. In accordance with an embodiment, the order of the derived image-kernel may be equal to the first resolution of the imaging sensor 318.

In another example, an image-kernel ($K_C$) for the location index (LC) in the table 1 may be given by equation (2) as:

$$\begin{bmatrix} 0 \\ 1 \\ 2 \\ 3 \\ 4 \\ 5 \\ \vdots \end{bmatrix} = K_C \quad (2)$$

where each row or column of the image-kernel ($K_C$) may include a kernel coefficient, such as 0, 1, 2, and 3, for a corresponding pixel-array (or row/column) of pixels of the imaging sensor 318. In accordance with an embodiment, the order of the derived image-kernel may be equal to an order of a column of pixels in the imaging sensor 318.

The kernel derivation engine 308 may be further configured to store the derived image-kernel for the plurality of speed value of the vehicle 102 at each of the plurality of locations on the specified route. The derived image-kernel may be stored in the host memory 204B (or the memory device) of the image-capture system 300. In accordance with an embodiment, the aforesaid image-kernels or the motion vector information may be derived and stored before an autonomous mode of the vehicle 102 is selected for the specified route. In accordance with an embodiment, the image-kernels or the motion vector information may be derived before the journey of the vehicle 102 on the specified route.

During the motion of the vehicle 102 on the specified route, the vehicle 102 may cover the estimated plurality of locations at one or more of the estimated plurality of speed values. An estimation of a current speed value and a current location of the vehicle 102 may be executed during motion of the vehicle 102. The location sensor 310 and the speed sensor 312 in the image-capture system 300 may be configured to estimate the current location and the current speed value of the vehicle 102, respectively. The estimation of the current speed value and the current location may be utilized to predict a successive location of the vehicle 102 on the specified route.

In certain conditions, the vehicle 102 may be driven on a route different from the specified route for the vehicle 102. Such differentiation may be caused by manual driving of the vehicle 102 by a user. An updated route may be evaluated from the current location of the vehicle 102 and updated image-kernels and updated motion vector information may be generated for the updated route of the vehicle 102.

The prediction engine 314 may be configured to retrieve, from the main memory 204A, the motion vector information for the estimated current location and the estimated current speed value of the vehicle 102. Thereafter, the prediction engine 314 may be further configured to predict, at the current location of the vehicle 102, the successive location of the vehicle 102 on the specified route. The prediction may be based on the generated motion vector information for the current speed value of the vehicle 102 at the current location on the specified route. Alternatively stated, the prediction of the successive location may be based on addition or subtraction of the motion vector information from the current location of the vehicle 102 on the specified route.

In accordance with an embodiment, for a motion vector ($MV_X(n)$, $MV_Y(n)$) degrees at a current speed value of "N miles/hour" and at a current location ($LC_X(n)$, $LC_Y(n)$) for the location index of "n", the successive location ($LC_X(n+1)$, $LC_Y(n+1)$) may be predicted from equation (3) and (4):

$$LC_X(n+1) = LC_X(n) + MV_X(n) \quad (3)$$

$$LC_Y(n+1) = LC_Y(n) + MV_Y(n) \quad (4)$$

For example, using equation (3) and equation (4) for a motion vector ($MV_X$, $MV_Y$) of ("2.28E-5", "3.43E-6") degrees at a current speed value of "30 miles/hour" and at a current location for the LC of "1" (See Table 1) of ("77.69183419", "12.92984374") degrees, the successive location ($LC_X(2)$, $LC_Y(2)$) may be predicted as:

$LC_X(2) = 77.69183419 + 2.28E-5 = 77.69183647$
Degrees $LC_Y(2) = 12.92984374 + 3.43E-6 = 12.92987799$
Degrees The predicted successive location may be provided by the prediction engine 314 to the selection engine 316 of the image-capture system 300. The selection engine 316 may be further configured to select the derived image-kernel for the predicted successive location of the vehicle 102. The derived image-kernel for the predicted successive location may be selected on the basis of the predicted successive location and the estimated current speed value of the vehicle 102 on the specified route. Alternatively stated, the selection engine 316 may identify or search for the derived image-kernel for the current speed value and the predicted successive location of the vehicle 102 on the specified route. The search may be executed in a database, stored in the host memory 204B. Additionally, the selection engine 316 may be further configured to select the image-kernel derived for the current speed value and the current location of the vehicle 102 on the specified route. The derived image-kernel for the current location and the current speed value of the vehicle 102 may be transferred to the plurality of current image-kernel registers 324A ... 324N of the imaging sensor 318 before the vehicle 102 reaches the current location on the specified route. Thereafter, the selection engine 316 may be configured to transfer the derived image-kernel for the predicted successive location within the plurality of current image-kernel registers 324A ... 324N of the imaging sensor 318. The derived image-kernel for predicted successive location may be transferred from the host memory 204B, at the current location of the vehicle 102 on the specified route within the plurality of current image-kernel registers 324A ... 324N of the imaging sensor 318. It may be advantageous to transfer the derived image kernel from the host memory 204B for the successive location at the current location of the vehicle 102 within the plurality of current image-kernel registers 324A ... 324N of the imaging sensor 318. The transfer ascertains a near real time on-chip compensation of positional shifts in the plurality of pixels of images captured during the motion of the vehicle 102.

Within the imaging sensor 318, a specialized microprocessor associated with the imaging sensor 318 may be configured to provide a control signal to the sensor core 320 of the imaging sensor 318. The imaging sensor 318 or specifically the sensor core 320 may be configured to capture a first image at the predicted successive location on the specified route. The first image may be an equivalent of captured excitations that may be caused by illumination at the array of pixel-level circuitry within the sensor core 320.

The first image may exhibit a shift of a plurality of pixels, which may be caused by the rolling shutter effect. The shift of the plurality of pixels may correspond to a positional shift of each pixel value of a plurality of pixel values, captured by the sensor core 320 of the imaging sensor 318. Additionally, the sensor core 320 of the imaging sensor 318 may capture noise-affected pixel values as against expected pixel values to be captured by the sensor core 320 of the imaging sensor 318. Such deviation may be caused by illumination that may be caused by incoming vehicles or objects, low light noises, and the like.

Figure 5A:
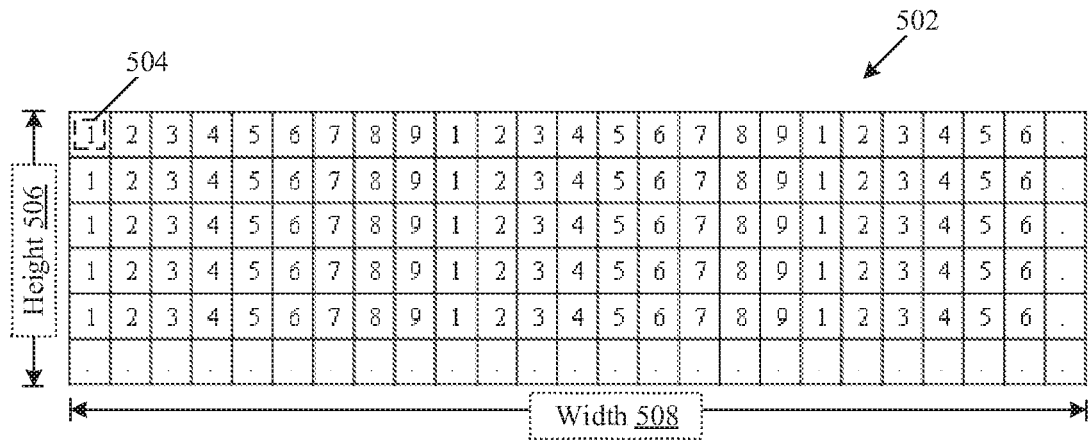
FIG. 5A illustrates an exemplary pixel-level view of a reference image that is an ideal image to be captured during motion by an imaging sensor, in accordance with an embodiment of the disclosure.
Figure 5B:
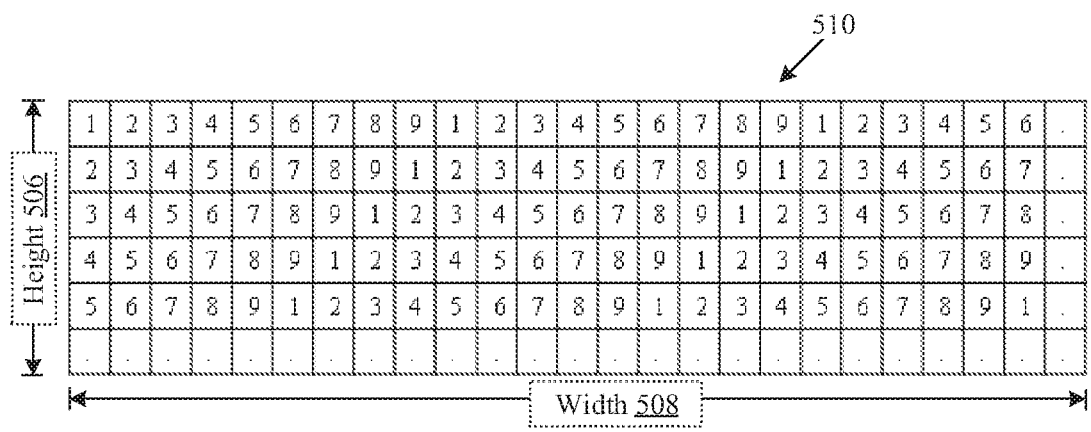
FIG. 5B illustrates an exemplary pixel-level view of an image affected by rolling shutter effect as captured during motion by an imaging sensor, in accordance with an embodiment of the disclosure.

In accordance with an embodiment, the shift of the plurality of pixels of the captured first image may be a circular shift of each pixel of the plurality of pixels in a corresponding pixel-array of the captured first image (as shown in FIG. 5B). In accordance with an embodiment, the shift of the plurality of pixels of the captured first image may be a left shift of each pixel of the plurality of pixels in a corresponding pixel-array of the captured first image. In accordance with an embodiment, the shift of the plurality of pixels of the captured first image may be a right shift of each pixel of the plurality of pixels in a corresponding pixel-array of the captured first image. The corresponding pixel-array may be a row or a column of the captured first image.

In accordance with an embodiment, the shift of the plurality of pixels in the corresponding pixel-array of the captured first image may be constant (as shown in FIG. 5B). In accordance with an embodiment, the shift of the plurality of pixels in a plurality of pixel-arrays of the captured first image may further vary based on a step-size. The step-size may be further based on the current speed value and the generated motion vector information for the current location of the vehicle 102 on the specified route.

For example, for first 3 expected pixel-arrays P[n], specifying pixels positions as 1, 2, 3, . . . , n, where n is equal to a length of the each pixel-array as well as the width of the captured first image, are provided (shown by matrix (5)) below:

$$\begin{matrix} 1 & 2 & 3 & 4 & 5 & 6 \\ 1 & 2 & 3 & 4 & 5 & 6 \ldots = P[n] \\ 1 & 2 & 3 & 4 & 5 & 6 \end{matrix} \quad (5)$$

First 3 captured pixel-arrays P[n], specifying pixels positions as 1, 2, 3, . . . , n, where n is equal to a length (6) of the each pixel-array as well as the width of the captured first image, are provided below (shown by matrix (6)):

$$\begin{bmatrix} 1 & 2 & 3 & 4 & 5 & 6 \\ 2 & 3 & 4 & 5 & 6 & 7 \ldots \\ 3 & 4 & 5 & 6 & 7 & 8 \end{bmatrix} = P[n] \quad (6)$$

Continuing with the above example of matrix (6), as mentioned above, the shift in pixel position is "0" for a first pixel-array $P_1[n]$, "1" for a second pixel-array $P_2[n]$ and "2" for a third pixel-array $P_3[n]$. Therefore, the shift in pixel position is constant for a captured pixel-array (row) and varies by a step-size of "1" while moving downwards row-by-row. In accordance with an embodiment, the shift of the plurality of pixels in the corresponding pixel-array of the captured first image may vary (not shown). Accordingly, the shift of the plurality of pixels in the plurality of pixel-arrays of the captured first image may further vary based on the step-size.

In accordance with an embodiment, the first image may be captured based on a progressive scan of a pixel-array (row or column of pixels) from the sensor core 320. In such case, a compensation for a shift of the plurality of pixels in the corresponding captured pixel-array may be required. The read-out register 322 may be configured to store a pixel-array of pixels values flushed from the sensor core 320 of the imaging sensor 318 in each read-out cycle. The pixel-array of pixel values may be associated with one of a row of pixel values or a column of pixel values depending upon whether pixel values are captured based on a vertical progressive scan or a horizontal progressive scan of pixel-level circuitry of the sensor core 320. For example, a stored pixel-array (P[i]) flushed out to the read-out register 322 may be given as follows (represented by (schema 7)):

$$\begin{matrix} [102 & 12 & 223 & 43 & 54 & 64 & \ldots] \\ (1) & (2) & (3) & (4) & (5) & (6) & \ldots \end{matrix} = P[i] \quad (7)$$

As mentioned above (schema 7), the stored pixel-array (P[i]) may comprise a series of pixel values, which may be further marked by pixel positions in square brackets. Here, i may be in a range of 1 . . . n and where n may correspond to the width of the captured first image or length of the read-out register 322.

With reference to the above embodiment, the compensation engine 328 may be configured to compensate for the shift of the plurality of pixels in the captured first image within the imaging sensor 318. The compensation of the shift of the plurality of pixels of the captured first image may be referred to as a line-by-line compensation of the captured first image. The line-by-line compensation may correspond to a sequential compensation for each pixel-array of the captured first image. Additionally, the compensation may be based on the derived image-kernel for the predicted successive location of the vehicle 102.

Different techniques to compensate for the shift of the plurality of pixels in the first image have been described hereinafter. However, the scope of the disclosure may not be construed to be limited by the description of the following exemplary techniques.

Figure 5C:
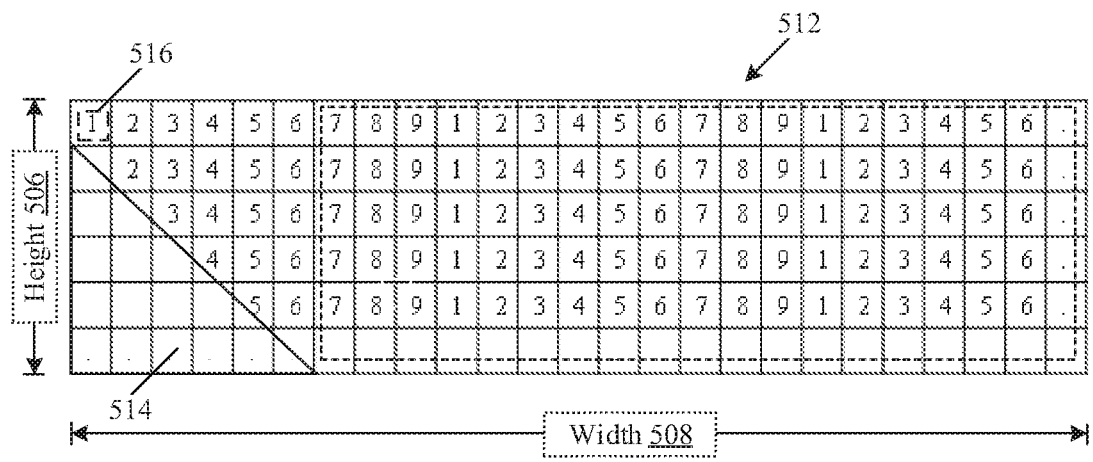
FIG. 5C illustrates an exemplary pixel-level view of an image compensated for the rolling shutter effect by an imaging sensor during motion of a vehicle, in accordance with an embodiment of the disclosure.

In a first technique, the compensation engine 328 may be configured to receive a pixel-array of a plurality of pixels of the captured first image from the read-out register 322 of imaging sensor 318. The pixel-array of the plurality of pixels may correspond to a row or column of the captured first image. Thereafter, the compensation engine 328 may be further configured to select an image-kernel array of the derived image-kernel for the successive location of the vehicle 102. The image-kernel array may be selected for the corresponding received pixel-array of the captured first image. Thus, the motion vector information is used not only to predict successive locations of the vehicle 102, but also to generate/derive the image kernel array. The received pixel-array and the selected image-kernel array may be stored in specialized registers (not shown) or the integrated memory (not shown) of the imaging sensor 318. A shift-compensated pixel-array of the captured first image may be generated by the compensation engine 328. The shift-compensated pixel-array may be generated based on a transformation of the received pixel-array by the selected image-kernel array of the derived image-kernel. The transformation may be an arithmetical operation or a logical operation between the selected image-kernel array and the received pixel-array of the captured first image. Exemplary transformations may include, but are not limited to, addition, multiplication, division, subtraction, logical AND, logical OR, logical NAND, logical NOR, logical XOR, shifting and logical NOT. The compensation engine 328 may be further configured to update the shift-compensated pixel-array in the integrated memory of the imaging sensor 318 for each of a plurality of pixel-arrays of the captured first image. The shift-compensated pixel-array may be iteratively updated in the integrated memory to obtain an updated image (as shown in FIG. 5C). The updated image may be associated a region within a first resolution of the updated image that may correspond to a plurality of undesired pixels (as shown in FIG. 5C).

For example, a received pixel-array (P[i]) of length (n) and a selected image-kernel array (Kc[i]) are given below:

$$[3\ 4\ 5\ 6\ 7\ 8\ 9\ 10\ \ldots\ ]=P[i] \qquad (8)$$

$$[3\ 3\ 3\ 3\ 3\ 3\ 3\ 3\ \ldots\ ]=Kc[i] \qquad (9)$$

A subtraction based transformation may be applied to the received pixel-array (P[i]) by the selected image-kernel array (Kc[i]) as shown in (8) and (9). In other words, the selected image-kernel array (Kc[i]) may be subtracted from the received pixel-array (P[i]) via matrix subtraction. Each coefficient Kc[1], Kc[2], ..., Kc[n] may be subtracted from a corresponding position value of the received pixel-array to obtain a shift-compensated pixel-array (PS[i]). The shift-compensated pixel-array (PS[i]) may be given as below:

$$[0\ 1\ 2\ 3\ 4\ 5\ 6\ \ldots\ ]=PS[i] \qquad (10)$$

The positional shift compensation brought upon by the transformation may lead to a vacant position corresponding to an undesired pixel, i.e. the $0^{th}$ position in the shift-compensated pixel-array (PS[i]), as shown in (10).

To further compensate for the plurality of undesired pixels in the updated image, the compensation engine 328 may further implement one of the two techniques (mentioned below) to generate a second image in real time or near-real time. The generated second image may be an optimally compensated output image from the imaging sensor 318.

Figure 5D:
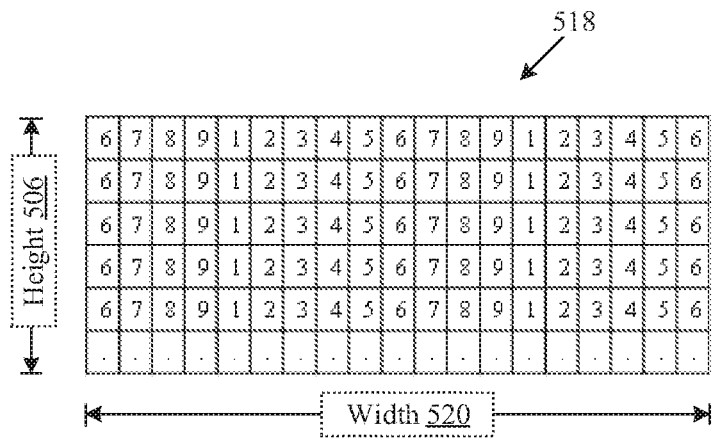
FIG. 5D illustrates an exemplary pixel-level view of an image obtained post compensation the image of FIG. 5C, in accordance with an embodiment of the disclosure.

In accordance with an embodiment, the compensation engine 328 may be configured to remove the region corresponding to the plurality of undesired pixels in the updated image (as shown in FIG. 5D). In other words, the compensation engine 328 may discard the region of the updated image that may comprise the plurality of undesired pixels, and may further select a region from the first resolution of the updated image minus the region of the plurality of undesired pixels. The second image may be obtained from removal of the undesired region from the updated image; however, a second resolution of the second image may be less than the first resolution of the updated image or the captured first image. For example, a width of the second image may be less than a width of the captured first image or the updated image.

Figure 5E:
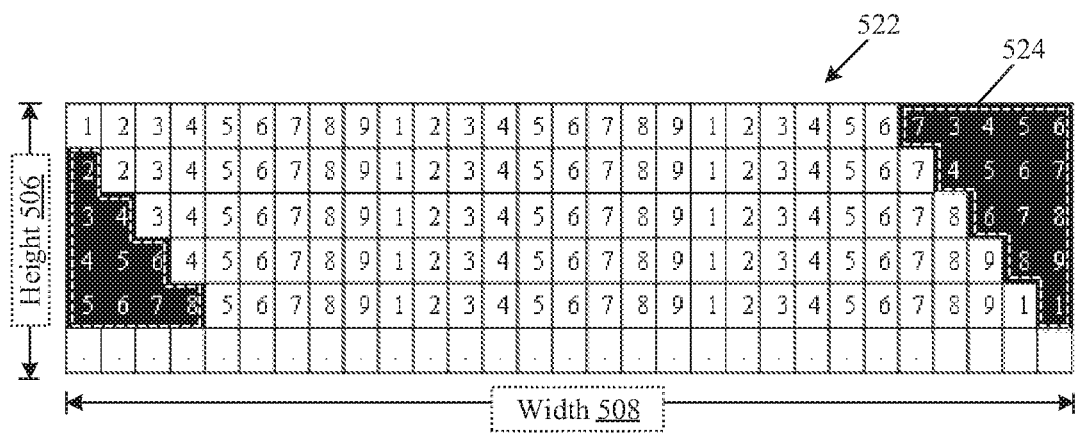
FIG. 5E illustrates an exemplary pixel-level view of an image obtained post compensation of the image of FIG. 5C, in accordance with another embodiment of the disclosure.

In accordance with an embodiment, the compensation engine 328 may be configured to populate the region with pixel values lying adjacent to the region corresponding to the plurality of undesired pixels in the updated image (as shown in FIG. 5E). The second image may be obtained having the second resolution equal to the first resolution of the captured first image.

Figure 6:
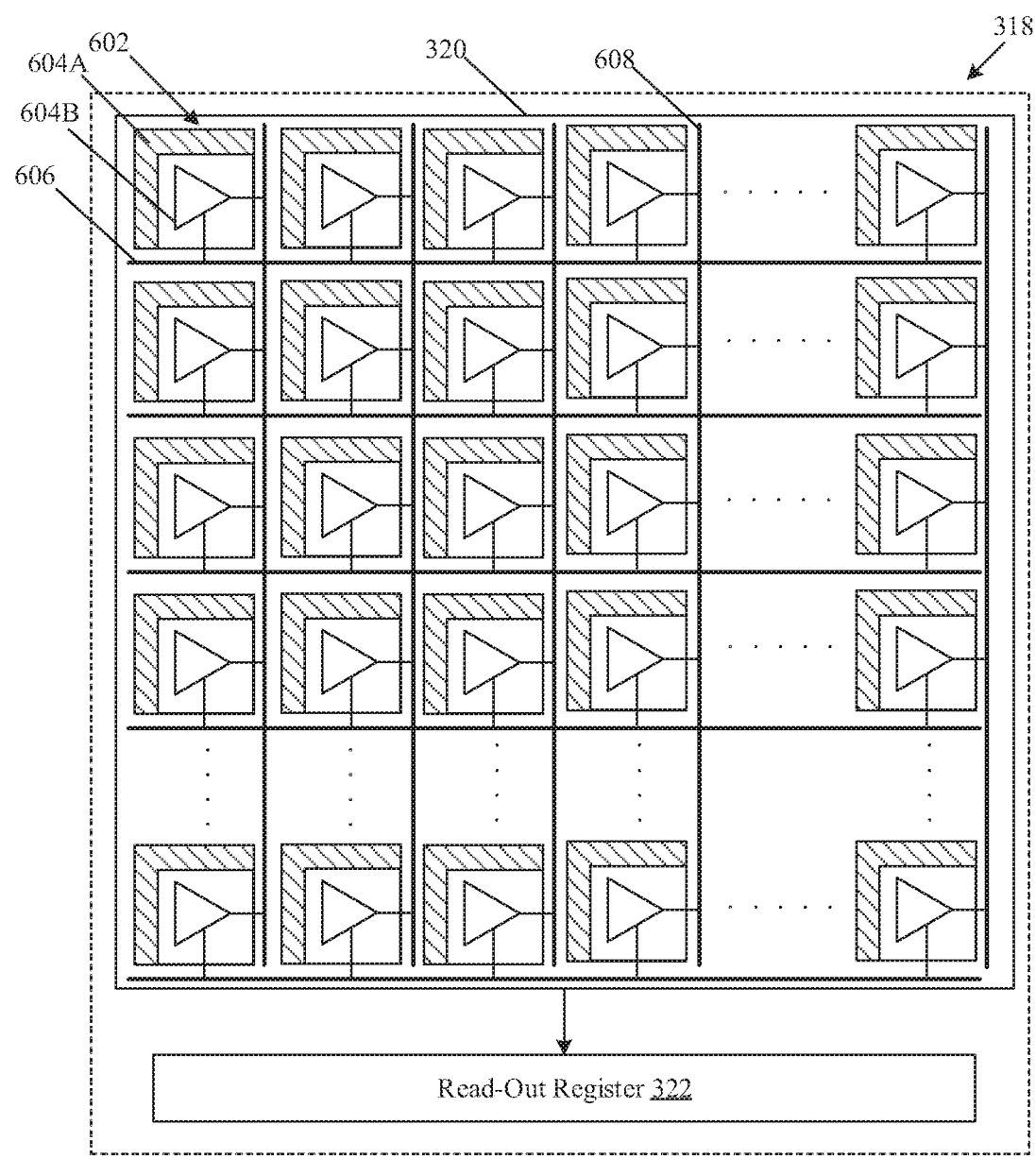
FIG. 6 illustrates exemplary circuitry of an imaging sensor adapted for on-chip compensation of rolling shutter effect, in accordance with an embodiment of the disclosure.

In a second technique, the sensor core 320 of the imaging sensor 318 may be configured to capture the first image with a first resolution that may be greater than a desired or target resolution for the second image (as shown in FIG. 6). The sensor core 320 of the imaging sensor 318 may be configured to capture a scaled pixel-array of a plurality of pixels (row or column) at the predicted successive location of the vehicle 102 on the specified route.

The compensation engine 328 may locally predict a maximal shift that may be caused at the current speed value of the vehicle 102. Thereafter, the compensation engine 328 may select a first pixel-array having a second resolution from the scaled pixel-array. The selection of the first pixel-array may be based on the locally predicted maximal shift of the plurality of pixels in the corresponding scaled pixel-array. Alternatively stated, the first pixel-array may be adaptively selected for each location on the specified route such that the effect of the maximal shift on the selected pixel-array at each corresponding location is minimal. The captured pixel-array may be associated with a length (or width) that may be greater than a corresponding length (or width) of the selected first pixel-array. Thereafter, the compensation engine 328 may be configured to update the first pixel-array in the integrated memory of the imaging sensor 318 for each captured pixel-array. The second image may be obtained from an iterative update of the selected first pixel-array in the integrated memory of the imaging sensor 318. The imaging sensor 318 may be associated with the first resolution and the second image may be associated with the second resolution. The first resolution of the imaging sensor 318 may be greater than or equal to the second resolution of the second image.

With greater resolution, the imaging sensor 318 may advantageously capture a wider view as opposed to a desired view. The captured wider view in the first image may include an excess region. Such an excess region may exist near borders of the first image and may capture regions previously inaccessible for low resolution imaging sensors in a single scan-cycle. Such excess region may be affected by the shift of the plurality of pixels. Therefore, the compensation engine 328, at the read-out stage, may reject the plurality of pixels corresponding to the excess region of the captured view. In effect, the second image may be of superior quality and of the desired resolution, and further suitable for use by other operational components (as described in FIG. 2) of the vehicle 102. The second image may be compensated for the rolling shutter effect caused in the captured first image.

The compensation of the shift of the plurality of pixels of the captured first image through the aforementioned techniques may be on-chip compensation within the imaging sensor. Advantageously, the on-chip compensation may be executed in real time or near-real time, thereby reducing a delay with accessibility of the second image by other operational components of the vehicle 102. It is further advantageous to adaptively compensate for positional shifts of pixels for different speed values of the vehicle 102, which ensures an optimum image quality that can be generated for even faster motion of the vehicle 102, for example, at speed beyond speed threshold "X".

In some embodiments, the shift of the plurality of pixels of the captured first image may be globally compensated for the captured first image simultaneously in a single operational cycle. The global compensation may correspond to a concurrent compensation for different pixel-arrays for the captured first image. The global compensation may be executed similar to the line-by-line compensation, and therefore, the description has been omitted for the sake of brevity.

Figure 4A:
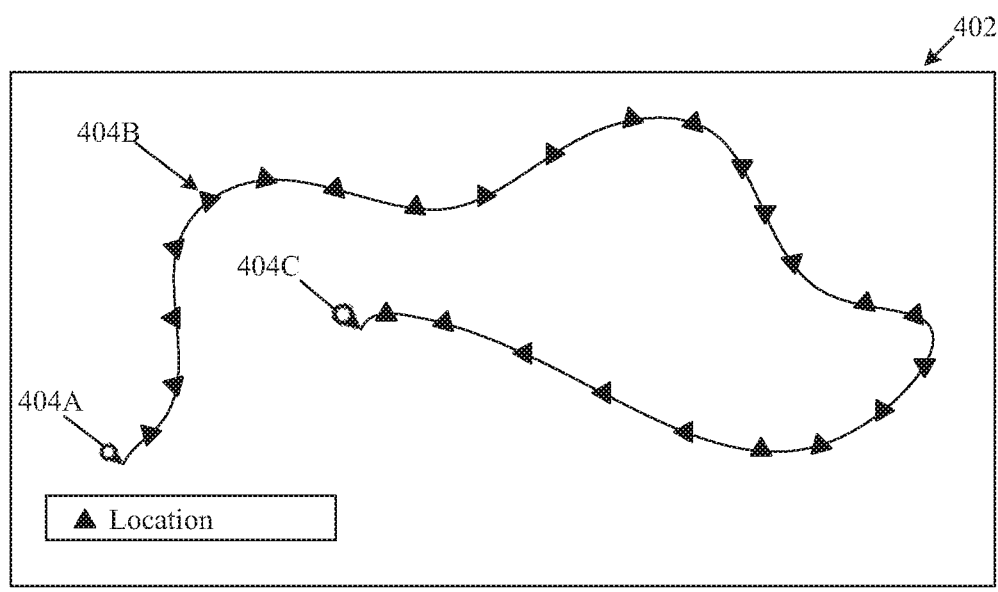
FIGS. 4A and 4B illustrate an exemplary route fed to a vehicle and a plot of motion information derived from the exemplary route, in accordance with an embodiment of the disclosure.
Figure 4B:
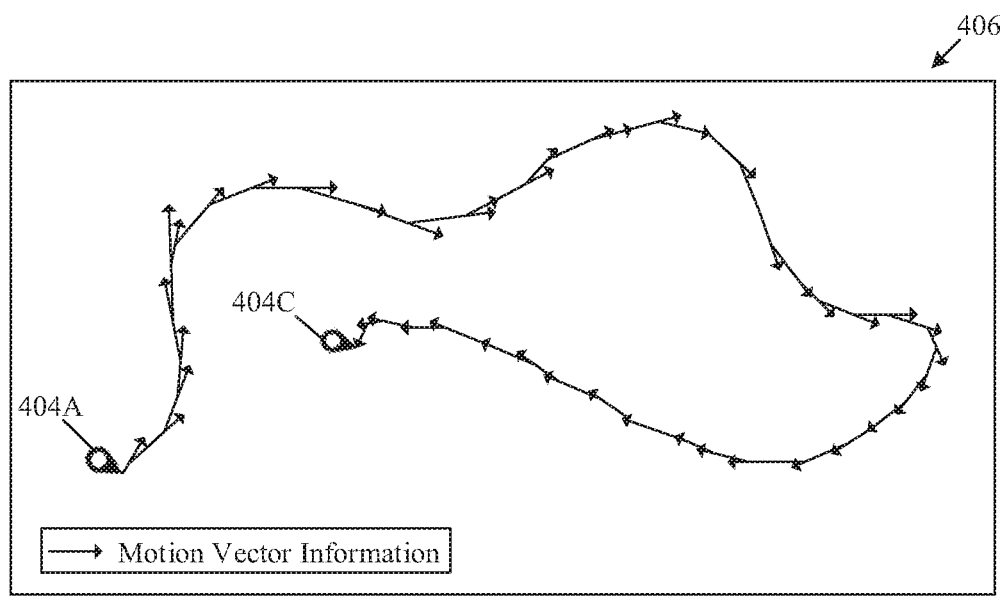

FIGS. 4A and 4B illustrate an exemplary route fed to a vehicle and a plot of motion information derived from the exemplary route, in accordance with an embodiment of the disclosure. FIGS. 4A and 4B are explained in conjunction with elements from FIGS. 1, 2, and 3. With reference to FIG. 4A, there is shown an exemplary view of a route 402 fed to the navigation unit 304 of the image-capture system 300. As shown, the route 402 may comprise a route-start marker 404A, a plurality of location markers 404B, and an end-route marker 404C. A continuous path may join each of the route-start marker 404A, the plurality of location markers 404B, and the route-end marker 404C. The continuous path may not necessarily be straight for the entire length of the route 402. The length of the route 402 may correspond to a length of a curve formed by the route 402. Further, the navigation unit 304 of the image-capture system 300 may be configured to select a plurality of locations that may correspond to the plurality of location markers 404B on the route 402. Each location of the plurality of locations may represent a positional coordinate, such as GPS coordinates, measured in one of degrees or miles. The plurality of locations may be updated as tabular records in a database, stored in the main memory 204A (FIGS. 2 and 3) of the image-capture system 300 (further described in FIG. 3).

With reference to FIG. 4B, there is shown an exemplary plot 406 of motion vector information for the plurality of location markers 404B of the route 402 of FIG. 4A. The motion vector information for the plurality of location markers 404B may be represented as a sequence of motion vectors (directed arrows) directed from the route-start marker 404A to the end-route marker 404C successively for each location marker of the plurality of location markers 404B. A direction of each motion vector may point to a probable direction of motion of the vehicle 102. The plot of motion vector information may be evaluated for a specific speed value, such as 20 miles/hour. In other cases (not shown), the plot of motion vector information may be different from the shown plot for the specific speed value used for the shown plot of the motion vector information. Such difference may arise with usage of different speed values for the representation of the motion vector information for same location markers on the route 404. The motion vector information has been further described quantitatively in FIG. 2.

FIG. 5A illustrates an exemplary pixel-level view of a reference image that is an ideal image to be captured during motion by an imaging sensor, in accordance with an embodiment of the disclosure. FIG. 5A is explained in conjunction with elements from FIGS. 1, 2, and 3. With reference to FIG. 5A, there is shown an exemplary image-matrix 502 of a desired or ideal image unaffected by the rolling shutter effect. The image-matrix 502 of the desired image may be an image-matrix of the second image (FIG. 2), obtained post on-chip compensation of a positional shift of a plurality of pixels in the captured first image of FIG. 5B. The image-matrix 502 may comprise a plurality of rows (or pixel-arrays) such that each row may comprise a plurality of pixels. The plurality of rows, stacked over each other, may be associated with a height 506 of the image-matrix 502. Each row may be further associated with a width 508 of the image-matrix 502. The height 506 and the width 508 may collectively be referred to as the resolution of the desired image. Each row or column of the image-matrix 502 may further comprise a positional argument 504 for each pixel, such as 1 to represent $1^{st}$ positional argument, 2 to represent $2^{nd}$ position argument, and 3 to represent $3^{rd}$ positional argument. The positional argument may be associated with a location of a corresponding pixel value instead of actual pixel value.

FIG. 5B illustrates an exemplary pixel-level view of an image affected by rolling shutter effect as captured during motion by an imaging sensor, in accordance with an embodiment of the disclosure. FIG. 5B is explained in conjunction with parameters of FIGS. 1, 2, 3, and 5A. With reference to FIG. 5B, there is shown an exemplary image-matrix 510 of a captured first image affected by a rolling shutter effect. The image-matrix 510 of the captured first image may be associated with a shift of a plurality of positional arguments 504 in each row of the image-matrix 510. Additionally, the shift may be a constant circular shift for each row of the image-matrix 510 and may further increase by a step-size, such as 1, for each subsequent row while moving downwards row-wise for the image-matrix 510. The image-matrix 510 may be associated with a resolution that may be equal to the resolution of the desired image of FIG. 5A. The compensation engine 328 (FIG. 3) of the imaging sensor 318 may be configured to compensate for the shift of the plurality of pixels (positional arguments) in the image-matrix of the captured first image of FIG. 5B. Different compensation techniques have been described in FIG. 3 for generation of a shift-compensated second image from a captured first image and an exemplary output has been provided further in FIGS. 5C and 5D.

FIG. 5C illustrates an exemplary pixel-level view of an image compensated for the rolling shutter effect by an imaging sensor during motion of a vehicle, in accordance with an embodiment of the disclosure. With reference to FIG. 5C, there is shown an exemplary image-matrix 512 of an updated image that is obtained post compensation of the captured first image of FIG. 5B. FIG. 5C may be described in conjunction with parameters of FIGS. 5A and 5B. The image-matrix 512 of the updated image may represent a shift-compensated transformation of the image matrix 510 of the captured first image. As shown, the image-matrix 512 may comprise a plurality of undesired positional arguments 514 for a corresponding plurality of undesired pixels (FIG. 3) and a plurality of desired positional arguments 516 for a corresponding plurality of desired pixels (shown by the dotted line). The compensation engine 328 may be configured to generate the updated image having the plurality of undesired positional arguments 514 and the plurality of desired positional arguments 516.

FIG. 5D illustrates an exemplary pixel-level view of an image obtained post compensation the image of FIG. 5C, in accordance with an embodiment of the disclosure. FIG. 5D is explained in conjunction with parameters of FIGS. 1, 2, 3, 5A, 5B and 5C. With reference to FIG. 5D, there is shown an exemplary image-matrix 518 of a second image that is obtained post compensation of the updated image of FIG. 5C. By use of the compensation engine 328 (FIG. 3), a rectangular region (shown with the dotted line in FIG. 5C) for the corresponding plurality of desired pixels may be cropped from the updated image to generate the second image (as described in FIG. 3). The second image may be associated with a width 520 that is less than the width 508 of the updated image of FIG. 5C.

FIG. 5E illustrates an exemplary pixel-level view of an image obtained post compensation of the image of FIG. 5C, in accordance with another embodiment of the disclosure. FIG. 5E is explained in conjunction with parameters of FIGS. 1, 2, 3, 5A, 5B, 5C and 5D. With reference to FIG. 5E, there is shown an exemplary image-matrix 522 of the second image that is obtained post compensation of the updated image of By use of the compensation engine 328 (FIG. 3), the plurality of undesired pixels for the plurality of undesired positional arguments 514 (shown with dotted line in FIG. 5C) may be populated with adjacent pixel values for corresponding adjacent positional arguments of the updated image to generate the second image (as described in FIG. 3). A highlighted region 524 of the image-matrix 522 is shown, comprising pixel values duplicated from pixels having adjacent positional arguments.

FIG. 6 illustrates exemplary circuitry of an imaging sensor adapted for on-chip compensation of rolling shutter effect, in accordance with an embodiment of the disclosure. With reference to FIG. 6, there is shown the imaging sensor 318 that comprises the sensor core 320 communicatively coupled to the read-out register 322 (FIG. 3). The imaging sensor 318 may be a CMOS sensor placed on the body of the vehicle 102 to capture outside view of the surroundings of the vehicle 102 having the ability to be driven autonomously or semi-autonomously on a specified route. The sensor core 320 of the imaging sensor 318 may comprise an array of pixel-level circuitry 602, a row selection line 606, and a column selection line 608. Each pixel-level circuitry in the array of pixel-level circuitry 602 may comprise a photodiode 604A and an active charge amplifier 604B coupled to the photodiode 604A. Although not shown, the imaging sensor 318 may further comprise one of a microprocessor, a GPU, specialized registers for storage of the derived plurality of image-kernels, integrated memory, and the like.

The imaging sensor 318 may be associated with the first resolution, which may be greater than a desired resolution of a first image required as an output from the imaging sensor 318. Such higher resolution may correspond to an increase in number of pixel-level circuitry in the array of pixel-level circuitry 602 such that the imaging sensor 318 may capture a view greater than a previously available view. The increase in a number of pixel-level circuitry may be along a row or a column of pixel-level circuitry in the sensor core 320. A width (measured in pixels) of the captured first image may increase in accordance with an increase in a number of pixel-level circuitry along the row of pixel-level circuitry in the sensor core 320. Accordingly, a height (also measured in pixels) of the captured first image may increase in accordance with an increase in the number of pixel-level circuitry along the column of pixel-level circuitry in the sensor core 320. To compensate for the shift caused by the rolling shutter effect in the plurality of pixels of the captured first image, the imaging sensor 318 may be configured to flush a sub-array of pixels from each row or column of the array of pixel-level circuitry in the sensor core 320. Each row may be selected via the row selection line 606, and each column may be selected via the column selection line 608.

For example, the imaging sensor 318 may be associated with a width (W1 Pixels) that may be greater than the desired width (W2 Pixels) for the captured first image. The width (W1 Pixels) may be greater than the width (W2 Pixels) by 2N pixels. Such 2N pixels may be present near edges of the captured first image and most affected by the shift caused by the rolling shutter effect. Therefore, the compensation engine 328 may be configured to flush only W1-2N Pixels, i.e. W2 pixels from each row of the imaging sensor 318 to the read-out register 322. Thereafter, an array or a row of pixel values of the width (W2 pixels) may be updated in the integrated memory of imaging sensor 318 for each row or column of pixel-level circuitry in the imaging sensor 318. The second image may be obtained post iterative update of the array or row of pixel values in the integrated memory.

Figure 7A:
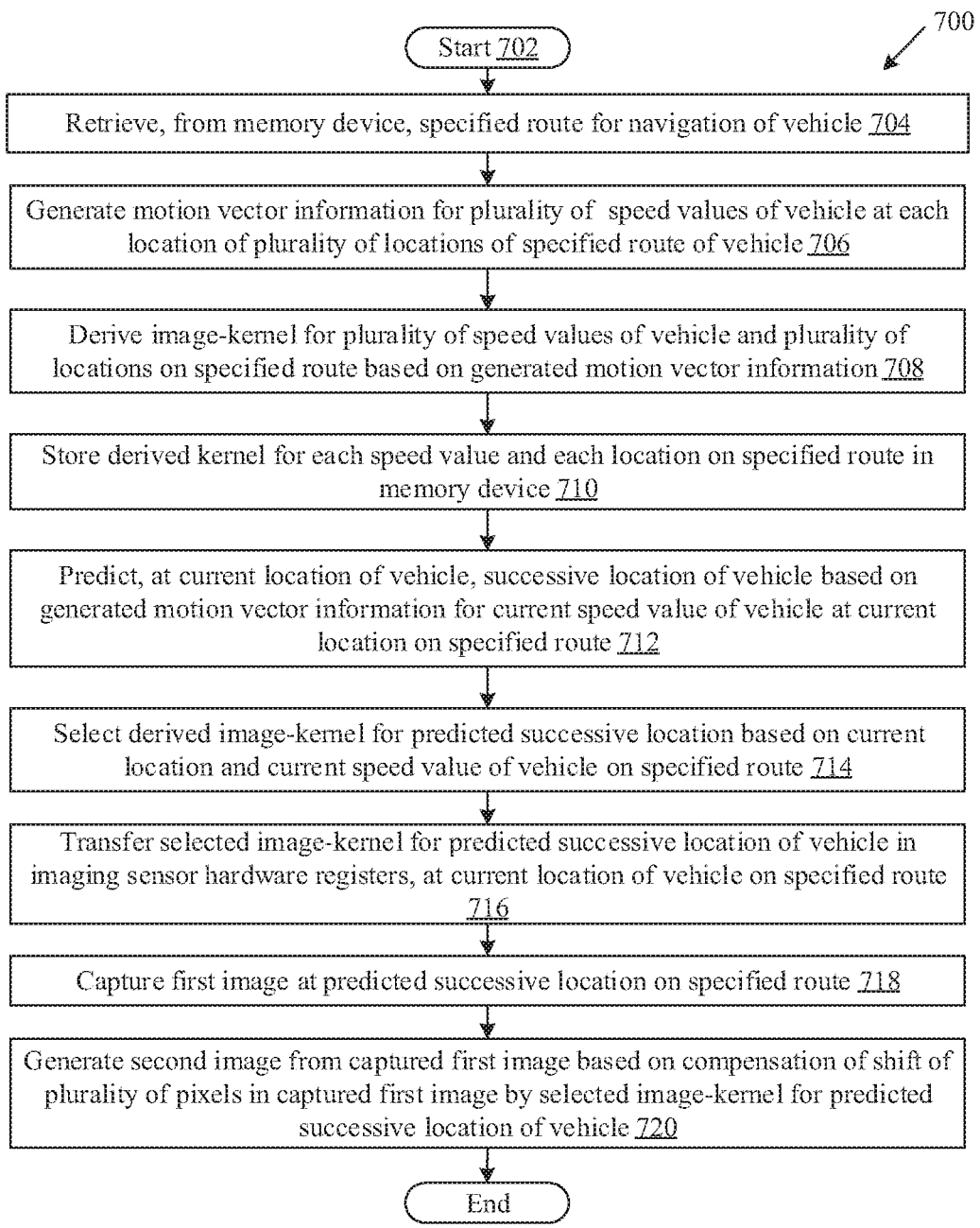
FIG. 7A is a flow chart that illustrates an exemplary method for compensation of rolling shutter effect in an imaging sensor of a vehicle, in accordance with an embodiment of the disclosure.

FIG. 7A is a flow chart that illustrates an exemplary method for on-chip compensation of rolling shutter effect in an imaging sensor of a vehicle, in accordance with an embodiment of the disclosure. FIG. 7A may be described in conjunction with FIGS. 1, 2, 3, 4A, 4B, 5A to 5E, and 6. Referring to FIG. 7A, there is shown a flowchart 700 that comprises exemplary operations from 702 through 722. The exemplary operations for the on-chip compensation may start at 702 and proceed to 704.

At 704, a specified route for navigation of the vehicle 102 may be retrieved from a memory device. The memory device, such as the main memory 204A or the host memory 204B, may be an onboard memory associated with a navigation device of the vehicle 102. The navigation unit 304 may be configured to retrieve the specified route from the memory device for the navigation of the vehicle 102 along the specified route (as described in FIG. 3).

At 706, motion vector information for a plurality of speed values of the vehicle 102 may be generated for each location of a plurality of locations on the specified route. The generation engine 306 may be configured to generate the motion vector information for the plurality of speed values of the vehicle 102 at each location of the plurality of locations on the specified route (as described, for example, in FIG. 3).

At 708, a plurality of image-kernels may be derived for the plurality of speed values of the vehicle 102 at each location of the plurality of locations on the specified route. The kernel derivation engine 308 may be configured to derive the plurality of image-kernels for the plurality of speed values of the vehicle 102 at each location of the plurality of locations on the specified route. An example of a derived image-kernel has been provided in FIG. 3.

At 710, the derived plurality of image-kernels may be stored in the memory device for each speed value and each location on the specified route. The memory device may be the host memory 204B of the image-capture system 300. The kernel derivation engine 308 may be configured to store the derived plurality of image-kernels in the memory device for each speed value and each location on the specified route (as described for example, in FIG. 3).

At 712, a successive location of the vehicle 102 may be predicted based on the generated motion vector information for a current location and a current speed value of the vehicle 102. The prediction engine 314 may be configured to predict the successive location of the vehicle 102 based on the generated motion vector information for the current location and the current speed value of the vehicle 102.

At 714, a selection from one of the derived plurality of image-kernels for the predicted successive location may be executed based on the current speed value and the generated motion vector information for the current location of the vehicle 102. The selection engine 316 may be configured to select one of the derived plurality of image-kernels for the predicted successive location. The selection may be based on the current speed value and the generated motion vector information for the current location of the vehicle 102.

At 716, the selected image-kernel for the predicted successive location may be transferred to the imaging sensor hardware registers, at the current location of the vehicle 102 on the specified route. The selection engine 316 may be configured to transfer the selected image-kernel for the predicted successive location to the imaging sensor hardware registers at the current location of the vehicle 102 on the specified route. The imaging sensor hardware registers may include the plurality of current image-kernel registers 324A . . . 324N and the plurality of predicted image-kernel registers 326A . . . 326N within the imaging sensor 318.

At 718, a first image may be captured at the predicted successive location of the vehicle 102 on the specified route.

The imaging sensor 318 may be configured to capture the first image at the predicted successive location of the vehicle 102 on the specified route.

At 720, a second image may be generated from the captured first image based on compensation of the shift of a plurality of pixels of the captured first image by the selected image-kernel. The compensation engine 328 may be configured to generate the second image from the captured first image based on compensation of the shift of the plurality of pixels of the captured first image. The shift may be compensated by the selected image-kernel (as described, for example, in FIG. 3). Control may pass to end.

Figure 7B:
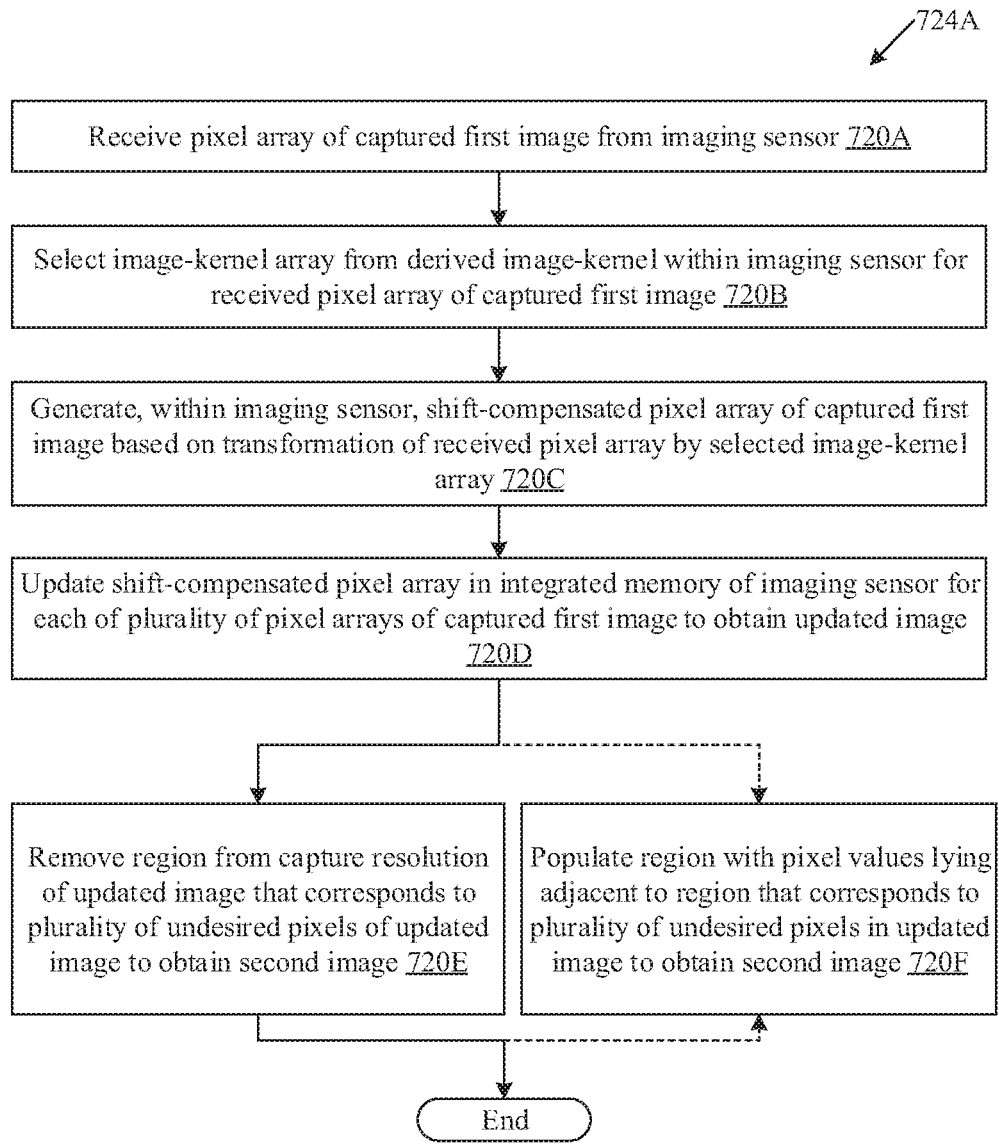
FIG. 7B is a flow chart that illustrates an exemplary method for generation of the image of FIG. 5D, in accordance with an embodiment of the disclosure.

FIG. 7B is a flow chart that illustrates an exemplary method for generation of a second image, in accordance with an embodiment of the disclosure. FIG. 7B may be described in conjunction with FIGS. 1, 2, 3, 4A, 4B, 5A, 5B, 5C, 5D, 5E, 6, and FIG. 7A. In FIG. 7B, there is shown a flow chart 724A that comprises exemplary operations from 720A through 702F that describes the operation 720 of FIG. 7A, for example, in details, to achieve on-chip compensation. The exemplary operations for generation of the second image may start at 720A and proceed to 720E or 702F.

At 720A, a pixel-array of a plurality of pixels of the captured first image may be received from the imaging sensor 318. The compensation engine 328 may be configured to receive the pixel-array of the plurality of pixels of the captured first image from the imaging sensor 318.

At 720B, a kernel-array comprising a plurality of coefficients may be selected for the received pixel-array. The compensation engine 328 may be configured to select the kernel-array comprising the plurality of coefficients for the received pixel-array.

At 720C, a shift-compensated pixel-array may be generated based on transformation of the received pixel-array by the selected kernel-array within the imaging sensor 318. The compensation engine 328 may be configured to generate the shift-compensated pixel-array based on transformation of the received pixel-array by the selected kernel-array, within the imaging sensor 318.

At 720D, shift-compensated pixel-array may be updated in the integrated memory of the imaging sensor 318 for each of a plurality of pixel-arrays of the captured first image to obtain an updated image. The compensation engine 328 may be configured to update the shift-compensated pixel-array in the integrated memory of the imaging sensor 318. The shift-compensated pixel-array may be updated iteratively for each of the plurality of pixel-arrays of the captured first image to obtain the updated image. In some embodiments, the control may pass to 720E. In some embodiments, the control may pass to 720F instead of 720E based on defined settings or specified-preferences.

At 720E, a region that may correspond to a plurality of undesired pixels may be removed from the first resolution of the updated image to obtain the second image. The compensation engine 328 may be configured to remove a region that may correspond to a plurality of undesired pixels from the updated image to obtain the second image. Control may pass to end.

At 720F, a region that may correspond to the plurality of undesired pixels may be populated with pixel values lying adjacent to the region. The compensation engine 328 may be configured to populate the region that may correspond to the plurality of undesired pixels with pixel values lying adjacent to the region. The second image may be obtained based on populating the region with pixel values. Control may pass to end.

Figure 7C:
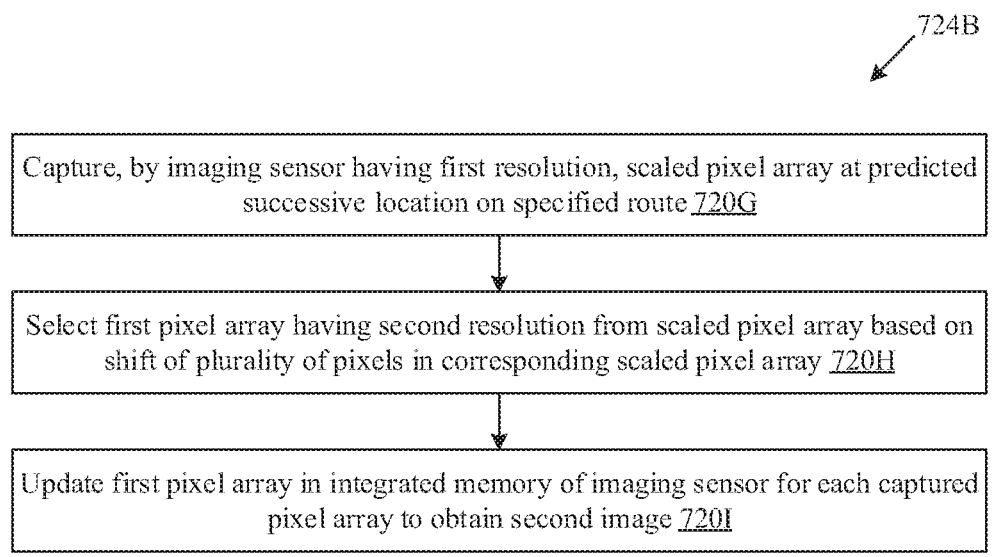
FIG. 7C is a flow chart that illustrates an exemplary method for generation of the image using the exemplary circuitry of FIG. 6, in accordance with an embodiment of the disclosure.

FIG. 7C is a flow chart that illustrates an exemplary method for generation of a second image, in accordance with yet another embodiment of the disclosure. FIG. 7C may be described in conjunction with FIGS. 1, 2, 3, 4A, 4B, 5A, 5B, 5C, 5D, 5E, 6, 7A, and 7B. Referring to FIG. 7C, there is shown a flow chart 724B that comprises exemplary operations from 720G through 720I that describes the operation 720 of FIG. 7A, for example, in details, to achieve on-chip compensation. The exemplary operations for generation of the second image may be described using the exemplary image sensor of FIG. 6.

At 720G, a scaled pixel-array may be captured at the predicted successive location of the vehicle 102 on the specified route. The imaging sensor 318 may be configured to capture the scaled pixel-array at the predicted successive location of the vehicle 102 on the specified route (as described in FIG. 3 and FIG. 6).

At 720H, a first pixel-array having the second resolution may be selected from the scaled pixel-array based on the shift of the plurality of pixels in the corresponding scaled pixel-array. The compensation engine 328 may be configured to select the first pixel-array having the second resolution from the scaled pixel-array. The selected may be based on the shift of the plurality of pixels in the corresponding scaled pixel-array.

At 720I, selected first pixel-array may be updated in the integrated memory of the imaging sensor 318 for each captured pixel-array to obtain the second image. The compensation engine 328 may be configured to update the selected first pixel-array in the integrated memory of the imaging sensor 318 for each captured pixel-array to obtain the second image. Control may pass to end.

The present disclosure provide several advantages over conventional image capture systems used in vehicles. It is advantageous to pre-estimate the plurality of locations (GPS coordinates) of the specified path. The generation engine 306 may advantageously generate the motion vector information prior to motion of the vehicle 102 on the specified route. It is further advantageous to use the pre-estimated plurality of locations to derive the plurality of image-kernels for each location and associated plurality of speed value of the vehicle 102. Such pre-estimation facilitates a prediction of successive location of the vehicle 102 that may further lead to faster on-chip compensation of images affected by the rolling shutter effect in near real time. It is further advantageous to use a CMOS progressive line scanning based sensor, where a real time or near-real time line-by-line compensation is possible along with line-by-line capturing of images. As the compensation may be scaled to a suitable degree of positional shift of the plurality of pixels in the captured first image, the proposed solution can be scaled to compensation of images captured during relatively faster movement of the vehicle 102 with respect to objects in vicinity of the vehicle 102.

In some embodiments, the vehicle 102 may be a land-based vehicle, watercraft, or an air-based vehicle, such as an aircraft or a drone. Thus, the vehicle 102 may also be referred to as a mobile machine. The mobile machine, such as the vehicle 102, may include the battery 224, the imaging sensor, such as the image-capture device 106, the ECU 104 that is powered by the battery 224 and is communicatively coupled to the imaging sensor. The ECU 104 comprises a plurality of circuits configured to generate motion vector information for a plurality of speed values of the mobile machine at each location of a plurality of locations of a specified route of the mobile machine. The plurality of circuits are further configured to derive a plurality of image-kernels for the plurality of speed values of the mobile machine at each of plurality of locations on the specified route, based on the generated motion vector information. The plurality of circuits are further configured to predict, at a current location of the mobile machine, a successive location of the mobile machine based on the generated motion vector information for a current speed value of the mobile machine at the current location on the specified route. The plurality of circuits are further configured to capture a first image at the predicted successive location on the specified route, wherein the first image exhibits a shift of a plurality of pixels caused by the rolling shutter effect. The plurality of circuits are further configured to generate a second image from the captured first image based on a compensation of the shift of the plurality of pixels in the captured first image within the imaging sensor by a derived image-kernel for the predicted successive location of the mobile machine.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An image capture system for a vehicle, comprising:
   an imaging sensor;
   a memory device; and
   a plurality of circuits communicatively coupled to the imaging sensor and the memory device, the plurality of circuits is configured to:
      generate motion vector information for a plurality of speed values of the vehicle at each location of a plurality of locations of a specified route of the vehicle;
      derive a plurality of image-kernels for the plurality of speed values of the vehicle at each of the plurality of locations on the specified route, based on the generated motion vector information;
      predict, at a current location of the vehicle, a successive location of the vehicle based on the generated motion vector information for a current speed value of the vehicle at the current location on the specified route;
      capture, by the imaging sensor, a first image at the predicted successive location on the specified route, wherein the first image exhibits a shift of a plurality of pixels caused by a rolling shutter effect; and
      generate a second image from the captured first image based on a compensation of the shift of the plurality of pixels in the captured first image within the imaging sensor by a derived image-kernel for the predicted successive location of the vehicle.

2. The image capture system according to claim 1, wherein the compensation of the shift of the plurality of pixels of the captured first image is on-chip compensation within the imaging sensor, and wherein the second image is compensated for the rolling shutter effect caused in the captured first image.

3. The image capture system according to claim 1, wherein the imaging sensor is a complementary metal-oxide-semiconductor (CMOS) sensor, and wherein the vehicle is an autonomous vehicle or a semi-autonomous vehicle.

4. The image capture system according to claim 1, wherein the compensation of the shift of the plurality of pixels of the captured first image is a line-by-line compensation of the captured first image, and wherein the line-by-line compensation corresponds to a sequential compensation for each pixel-array of the captured first image.

5. The image capture system according to claim 1, wherein the compensation of the shift of the plurality of pixels of the captured first image is a global compensation of the captured first image, and wherein the global compensation corresponds to a concurrent compensation for different pixel-arrays for the captured first image.

6. The image capture system according to claim 1, wherein the plurality of circuits is further configured to retrieve, from a navigation device communicatively coupled to the plurality of circuits, the specified route for navigation of the vehicle.

7. The image capture system according to claim 1, wherein the plurality of circuits is further configured to store the derived plurality of image-kernels for the plurality of speed values and for each location of the plurality of locations on the specified route in the memory device.

8. The image capture system according to claim 1, wherein the plurality of circuits is further configured to transfer the derived image-kernel from the derived plurality of image-kernels for the predicted successive location of the vehicle within the imaging sensor at the current location of the vehicle on the specified route.

9. The image capture system according to claim 1, wherein the plurality of circuits is further configured to select the derived image-kernel from the derived plurality of image-kernels for the predicted successive location based on the current location and the current speed value of the vehicle on the specified route.

10. The image capture system according to claim 1, wherein the successive location of the vehicle on the specified route is predicted based on the generated motion vector information during motion of the vehicle on the specified route.

11. The image capture system according to claim 1, wherein the plurality of circuits is further configured to compute the motion vector information at each speed value and at each location on the specified route based on a difference of location coordinates of a first location and corresponding location coordinates of a second location on the specified route, wherein the first location and the second location on the specified route are selected based on each speed value of the plurality of speed values of the vehicle for the specified route.

12. The image capture system according to claim 1, wherein each of the derived plurality of image-kernels includes a plurality of filter coefficients for on-chip compensation of the captured first image.

13. The image capture system according to claim 1, wherein the shift of the plurality of pixels of the captured first image is a circular shift of each pixel of the plurality of pixels in a corresponding pixel-array of the captured first image.

14. The image capture system according to claim 1, wherein the shift of the plurality of pixels in a corresponding pixel-array of the captured first image is constant.

15. The image capture system according to claim 1, wherein the shift of the plurality of pixels in a plurality of pixel-arrays of the captured first image varies based on a step-size that is based on the current speed value and the generated motion vector information for the current location of the vehicle on the specified route.

16. The image capture system according to claim 1, wherein the plurality of circuits is further configured to:
receive a pixel-array of the captured first image from the imaging sensor;
select an image-kernel array from the derived image-kernel within the imaging sensor for the received pixel-array of the captured first image;
generate, within the imaging sensor, a shift-compensated pixel-array of the captured first image based on a transformation of the received pixel-array by the selected image-kernel array of the derived image-kernel; and
update the shift-compensated pixel-array in an integrated memory of the imaging sensor for each of a plurality of pixel-arrays of the captured first image to obtain an updated image.

17. The image capture system according to claim 16, wherein the updated image is associated a region within the updated image that corresponds to a plurality of undesired pixels.

18. The image capture system according to claim 16, wherein the plurality of circuits is further configured to remove a region from the updated image that corresponds to a plurality of undesired pixels of the updated image to obtain the second image.

19. The image capture system according to claim 16, wherein the plurality of circuits is further configured to populate a region with pixel values lying adjacent to the region that corresponds to a plurality of undesired pixels in the updated image to obtain the second image.

20. The image capture system according to claim 1, wherein the plurality of circuits is further configured to:
capture, by the imaging sensor having a first resolution, a scaled pixel-array at the predicted successive location on the specified route, wherein the scaled pixel-array is associated with the first resolution that is greater than a second resolution; and
select a first pixel-array having the second resolution from the scaled pixel-array based on the shift of the plurality of pixels in the corresponding scaled pixel-array.

21. The image capture system according to claim 20, wherein the plurality of circuits is further configured to update the first pixel-array in an integrated memory of the imaging sensor for each captured pixel-array to obtain the second image.

22. The image capture system according to claim 20, wherein the first resolution corresponds to a resolution of the imaging sensor and the second resolution corresponds to a resolution of the second image.

23. A method, comprising:
in an electronic control unit (ECU) of a vehicle:
generating, by a plurality of circuits, motion vector information for a plurality of speed values of the vehicle at each location of a plurality of locations of a specified route of the vehicle;
deriving, by the plurality of circuits, a plurality of image-kernels for the plurality of speed values of the vehicle at each of the plurality of locations on the specified route, based on the generated motion vector information;
predicting, by the plurality of circuits, at a current location of the vehicle, a successive location of the vehicle based on the generated motion vector information for a current speed value of the vehicle at the current location on the specified route;
capturing, by the plurality of circuits, a first image at the predicted successive location on the specified route, wherein the first image exhibits a shift of a plurality of pixels caused by a rolling shutter effect; and
generating, by the plurality of circuits, a second image from the captured first image based on a compensation of the shift of the plurality of pixels in the captured first image within an imaging sensor by a derived image-kernel for the predicted successive location of the vehicle.

24. A mobile machine, comprising:
a battery;
an imaging sensor; and
an electronic control unit (ECU) that is powered by the battery and is communicatively coupled to the imaging sensor, comprises a plurality of circuits configured to:
generate motion vector information for a plurality of speed values of the mobile machine at each location of a plurality of locations of a specified route of the mobile machine;
derive a plurality of image-kernels for the plurality of speed values of the mobile machine at each of the plurality of locations on the specified route, based on the generated motion vector information;
predict, at a current location of the mobile machine, a successive location of the mobile machine based on the generated motion vector information for a current speed value of the mobile machine at the current location on the specified route;
capture a first image at the predicted successive location on the specified route, wherein the first image exhibits a shift of a plurality of pixels caused by a rolling shutter effect; and
generate a second image from the captured first image based on a compensation of the shift of the plurality of pixels in the captured first image within the imaging sensor by a derived image-kernel for the predicted successive location of the mobile machine.

* * * * *